United States Patent [19]

Guignard et al.

[11] 4,117,600
[45] Oct. 3, 1978

[54] METHOD AND APPARATUS FOR PROVIDING REPEATABLE WIRELINE DEPTH MEASUREMENTS

[75] Inventors: Jean Guignard, Petit Sainte-Mesme; Jean-Marie Lorre, Gif-sur-Yvette, both of France

[73] Assignee: Schlumberger Technology Corporation, New York, N.Y.

[21] Appl. No.: 706,105

[22] Filed: Jul. 16, 1976

[30] Foreign Application Priority Data

Jul. 22, 1975 [FR] France .................... 75 22777

[51] Int. Cl.² .................. G01B 3/12; G01B 5/04
[52] U.S. Cl. .................................................. 33/133
[58] Field of Search ............ 33/134, 126, 129, 132, 33/133, 125 B, 127; 73/151

[56] References Cited

U.S. PATENT DOCUMENTS

| | | | |
|---|---|---|---|
| 2,782,515 | 2/1957 | Mayes | 33/129 |
| 3,490,150 | 1/1970 | Whitfill | 33/133 |
| 3,497,958 | 3/1970 | Gollwitzer | 33/133 |
| 3,566,478 | 3/1971 | Hurlston | 33/126 |
| 3,753,294 | 8/1973 | Attaci et al. | 33/133 |

Primary Examiner—Harry N. Haroian
Attorney, Agent, or Firm—Edward M. Roney, III; Kenneth Olsen; Bruce N. Carpenter

[57] ABSTRACT

A depth measurement system particularly suitable for automatically driving a recorder under varying wireline measurement conditions for repeatedly depth recording measurements from borehole tools produces different measurements at generally the same point on the wireline which would correspond if measurement conditions were ideal, but are subject to non-repeatable variations. Accordingly, these signals are automatically utilized to provide a repeatable signal. In one form, the signals correspond to magnetic marks and to incremental movement of the wireline, the latter produced by mechanically coupled devices subject to slippage, variations in circumference, etc. The incremental signals are counted and compared with the number expected for such intervals, a low count indicating slippage or the like and used to provide an appropriate alarm and/or an automatically slippage corrected signal particularly suitable for driving a recorder. Also described are method and apparatus for driving a recorder having a maximum safe speed for changing depths which is somewhat slower than permissible for wireline movement. Accordingly, the recorder drive is controlled to allow the recorder depths to lag temporarily behind the wireline movement without losing recorder depth to borehole depth correspondence. A pulse series correction is also described for providing N pulses per 10" where N corresponds to the non-zero, least significant digits of a correction factor close to unity but requiring at least n digits to express.

26 Claims, 9 Drawing Figures

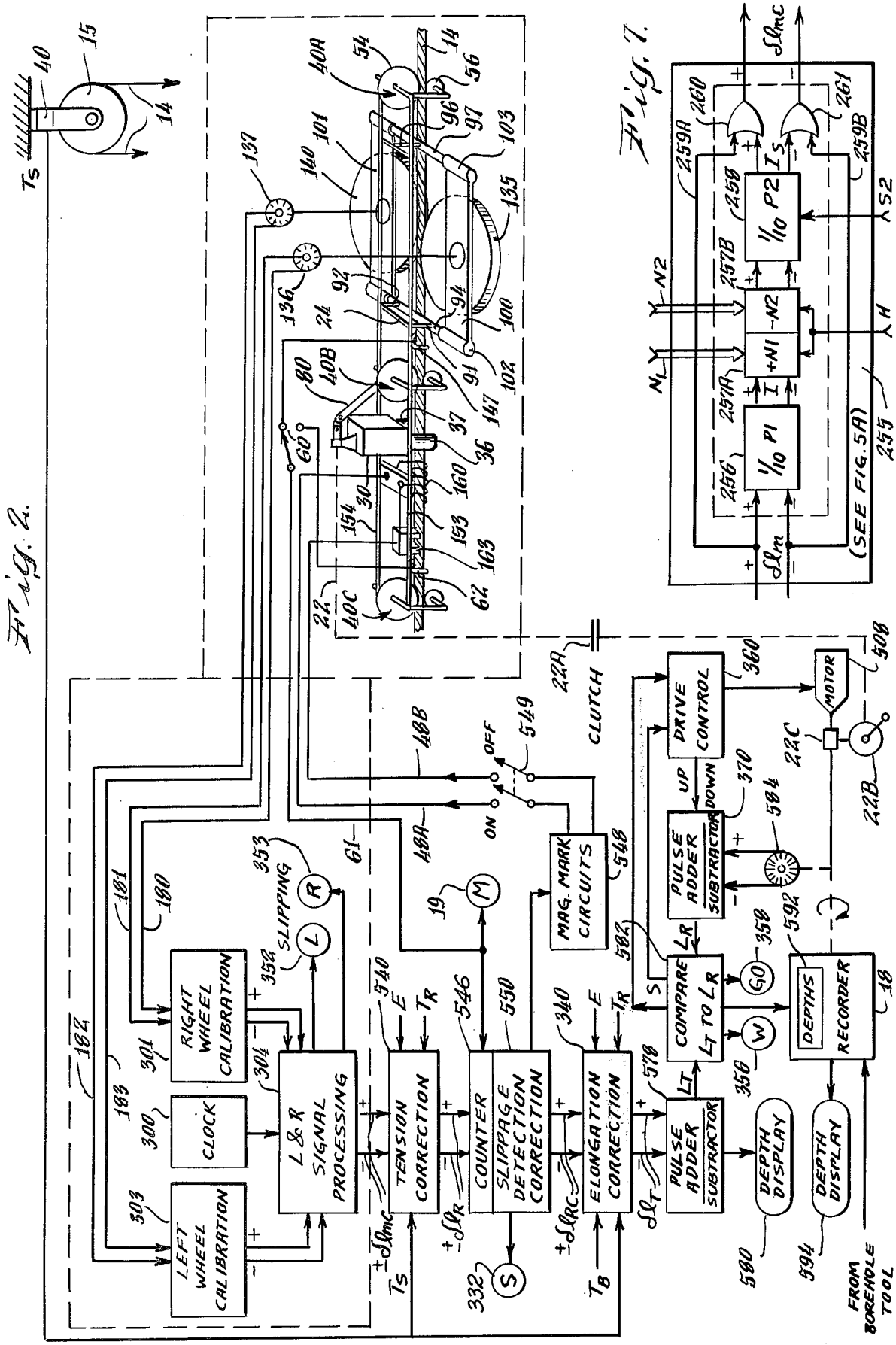

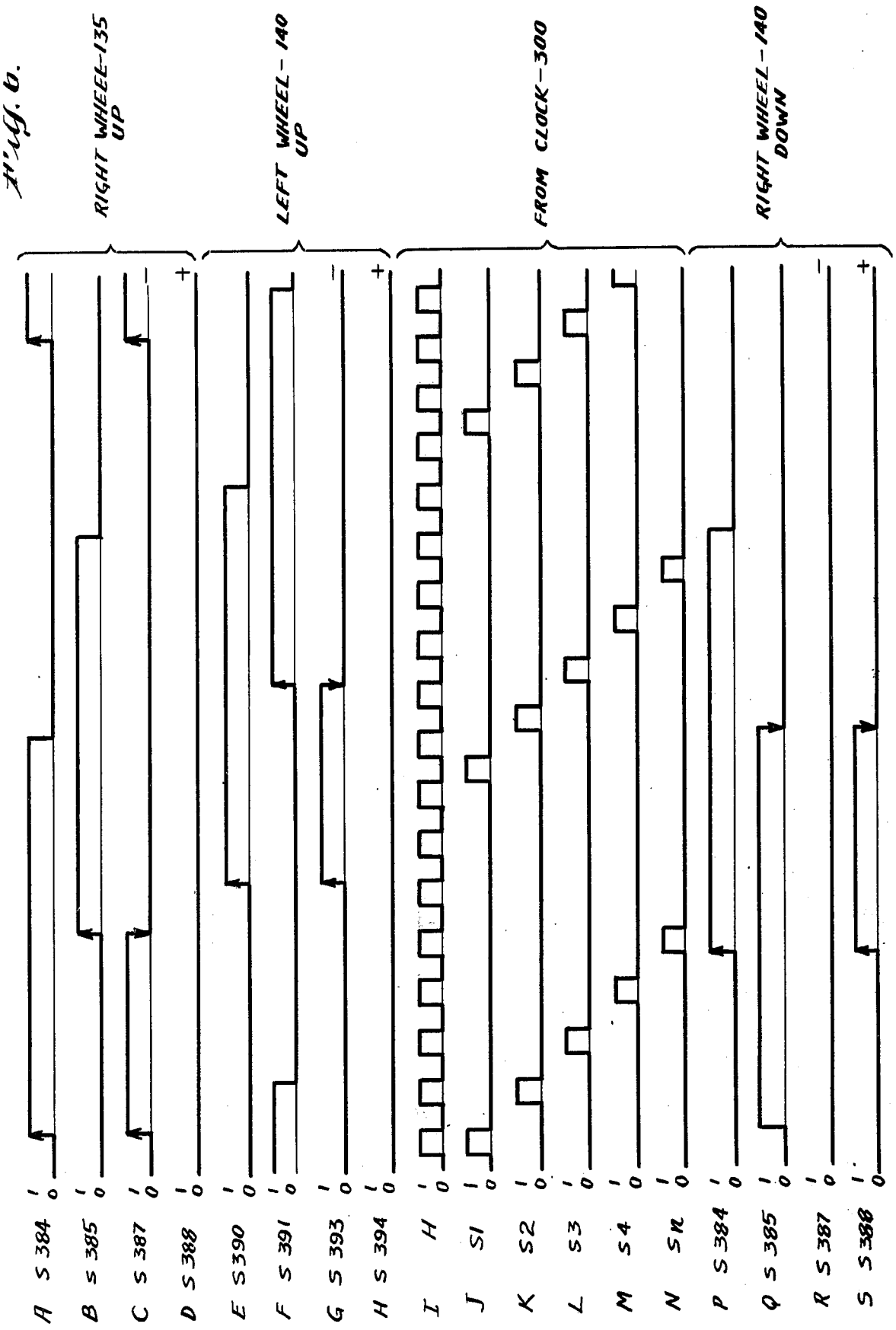

METHOD AND APPARATUS FOR PROVIDING REPEATABLE WIRELINE DEPTH MEASUREMENTS

FIELD OF THE INVENTION

Method and apparatus for providing wireline depth measurements for a borehole tool lowered in the borehole on the wireline and more particularly for providing repeatable depth signals for depth matching and recording measurements made on different wireline runs.

In general, two types of wireline depth measurement systems are used. One employs a calibrated tangential wheel or sheave at the surface, and the other employs marks (usually magnetic) placed on the wireline at known depths or intervals and under known reference conditions. The wheel system will be described first.

The wireline measurement wheel is usually located several tens of feet from the top of the borehole, such as at the point where the wireline is supported above the borehole in a derrick, or between this point and a winch used to spool and store the wireline and run it in and out of the borehole. The placement of the wheel at a point some distance from the top of the borehole is necessary in order to provide room for long borehole tools to be seen as they emerge from the borehole and clear the borehole before encountering the first restriction on the wireline. Further, the measurement wheel usually is located near the winchman's depth counter and recorders used for recording measurements from the borehole tool since the rotation of the wheel may be mechanically linked to drive these devices.

There are several sources of error and varying conditions which lead to poor accuracy and more particularly to lack of repeatability when measurement wheels are used to drive depth counters and recorders. The linkage between the wheel and these devices and the devices themselves place a torque load on the wheel which, under adverse conditions often present at the wheel, cause errors in the depth measurements due to slippage between the wheel and the wireline. Further, changes in the circumference of the wheel due to mud buildup on the wheel, for example, or differences in contact area and variations in the pressure between the wheel and the wireline as the wireline is run in and out of the borehole produce additional instability, uncertainty, and inaccuracy to the measurements. As such, systems using a measurement wheel as the only source of depth information are generally unreliable for accurate depth measurements and for driving a recorder for recording measurements from the borehole tool versus depth. This is particularly true when a recording made on one run must be accurately merged at corresponding depths with an additional recording made on another run.

While low torque drives provided improvements, slippage is still a problem since wheel bearings can still fail, and wheel-to-wireline contact pressures vary for a number of reasons and more particularly because slippage may exist undetected for relatively long periods and accumulate sizeable errors before being detected.

Slippage may be detected by an alert and experienced operator noting the apparent depth accumulated by the wheel does not match the depth corresponding to a mark on the wireline known to him, as for example a flag placed on the line on a previous run when the borehole tool is at a known depth. Unfortunately, such flags are too infrequent, often not noticed by a tired operator, or the flag is at a depth too close to the bottom of the borehole such that slippage might accumulate unnoticed and falsely indicate a much too shallow depth, which consequently could allow the borehole tool to unexpectedly impact the bottom of the borehole. Similarly, on the run out of the borehole, accumulated slippage may led the operator to believe the borehole tool is deeper than indicated which could result in the unexpected surfacing and impacting of the borehole tool with a support sheave and endangering both equipment and personnel.

It is therefore an object of the present invention to provide automatic slippage detection indications to alert the operator and allow for correction before serious errors accumulate.

After correcting the cause of slippage, such as insufficient contact pressure, mud on the wheel, etc., an attempt to correct for the accumulated slippage error may be made by the operator by adding or subtracting the accumulated slippage. Here the operator must be careful to remember the slippage depth correction must be added during the run into the borehole and subtracted during the run out. Where flags or marks are present at close intervals on the wireline, these corrections must be kept current as errors accumulated over several hundred feet may lead to possibility of confusing one mark for another and correcting to the wrong mark. For example, in a magnetic mark depth system where marks are at 100-foot intervals, a 50-foot accumulation of slippage would provide a false depth indication midway between two marks. The operator would have to correctly identify the depth corresponding to these marks by remembering which direction slippage errors would affect the indicated depth and apply the corrections in the proper direction. This direction, of course, differs between the run in and the run out. When the slippage correction is made improperly, as in the above example, it is possible the entire log could be run and recorded 100 feet off the correct depth.

Of course, even when the slippage correction is known and made properly, the indicated depth is correct only at the depth at which the correction is applied. Further slippage corrections are necessary as the borehole tool depth is changed.

It is therefore an additional object of the present invention to provide automatic and continuous corrections for slippage to prevent accumulation of slippage errors and provide an accurate and consistent depth indication at all times during the run into and out of the borehole.

One varying condition associated with measurement wheels is the accuracy and stability of their circumference during the logging operation. Since each rotation of the wheel corresponds to an elemental length of the wireline, even a small error in this length accumulates on each rotation and can lead to large errors with problems similar to those described above for slippage. However, unlike the direction of the slippage error, the direction of the circumference variation errors may not be predictable, as the circumference may be either too large as, for example, increased through layers of mud packed on its surface, or too small, as decreased by wear. Further, extremes of operating temperatures may produce circumferences which are either too large or too small for the same wheel.

While the use of wheels made of material such as INVAR, which have low temperature expansion coefficients, has somewhat minimized the circumferential variation of wheels due to temperature variations, manufacturing tolerances and wear prevent all wheels from having an exact standard circumference. The wheels could be made adjustable, but then they must be segmented and the segmenting creates new problems.

Despite strict manufacturing control, operators learn from experience or calibration runs that one particular wheel is too large and another is too small. The operator then attempts to correct for each wheel variance, adding for one wheel while subtracting for another. The correction is one way while going in the borehole and the reverse while coming out. Further, operators tend to let the correction accumulate for long intervals such as several thousand feet and then enter the correction at one time. If corrections are to be done consistently, both the direction and degree of the each correction and the correction depth must be noted and repeated for each run. Still further, if a substantial time lapses between runs, different operators and even equipment may make different runs. Needless to say, confusion can result and errors are likely.

Therefore, it is a further object of this invention to provide automatic and continuous corrections for a variance of a given wheel from an established standard for such wheels.

Even if wheel variance corrections are conscientiously applied both correctly and consistently, there are circumstances where the depth measurements from one wheel will randomly vary from another, at least for a short period, and not correspond exactly to the movement of the wireline. For example, if material adheres to the tangential surface of the wheel, it will temporarily increase the diameter of the wheel at that point until pressed off, perhaps several rotations later. Also, material may temporarily adhere to points preferentially along one side of the wireline, as for example, a water drop occasionally clinging to and freezing on the bottom side of the wireline. These random bumps will artificially increase the path length of a wheel traveling over that side of the wireline such that the rotation of the wheel will not correspond temporarily to the wireline movement.

With only one source of depth information available during a given run, there is little way the above sort of random variation can be detected. Further, since the condition only exists on a temporary basis, even if detected, it is not clear how the operator could provide an immediate and appropriate compensation.

Therefore, it is a still further object of the present invention to produce at least two signals, each corresponding at least under ideal measurement conditions to the wireline movement and a means for utilizing these signals to automatically provide a compensation for such random variations.

Operational conditions associated with logging of a borehole render many industrial measurement devices impractical for well logging. One of these conditions is the necessity to repeatedly spool the wireline on a winch so that it may be stored between runs and transported from well to well. Spooling must be accomplished in an orderly manner such that wireline crushing loads or variations in tension do not result at any point which might lead to distorting or breaking insulation or electrical conductors contained within the wireline. To facilitate the spooling, a winch operator operates a mechanical spooling arm which engages the wireline and guides it along a selected winding pattern as it is spooled on the winch to facilitate neatly spooling the wireline.

It is preferred that the measurement wheel be located in the proximity of the winch because the winch operator can then observe the action of the wheel. Unfortunately, varying conditions are usually extreme in the proximity of the spooling arm. Both the spooling action, particularly at breaks in the spooling pattern near edge flanges on the winch, and variations in wireline tension caused by wireline and borehole tool drag on the side of the borehole, cause wide variations in lateral and vertical forces on the wireline as it is run in and out of the borehole. It is known that measurement wheel measurements vary when such external forces are exerted on them changing the contact pressure and area and perhaps even distorting the shape of the wireline and/or the wheel.

Variations in the contact area are important, since this varies the distribution of the pressure between the wireline and the wheel. A wheel having the wireline contact area one-half its circumference, as does the support sheave, will vary its measurements from an identical wheel having wireline contact only around one-fourth its circumference, as is typical of an alignment sheaves, and will vary considerably from a wheel having a tangential contact. Thus, one requirement for accurate wireline measurements under well logging conditions is the placement of the measuring wheel at a point on the wireline where the contact area will not vary and where contact forces are not sufficient to distort either the wireline or the wheel.

Possible placement points are limited because, as previously mentioned, adequate clearance must be provided for the borehole tool at the top of the borehole. Thus, for example, the wireline measuring wheel system used in cable drilling and disclosed in U.S. Pat. No. 1,768,809 would not provide the required clearance because it requires two wheels on opposite sides of a vertical section of the cable present at the top of the borehole. The patent is of interest in that it shows two separate depth registers, one for each wheel, one register to serve as a check on the other or to be used in the event one register became unserviceable.

One approach to prevent slippage under industrial conditions rather than well logging conditions is described in U.S. Pat. No. 3,828,437, issued Aug. 13, 1974 to J. C. Heselwood. A pair of opposing endless belts are held in frictional contact along the wireline. Each belt is operatively connected to a differential such that the drive load is shared between the belts. The output shaft of the differential actuates a digital counter device. While this device may be suitable for measuring newly manufactured wirelines under industrial conditions where variations in factors such as tension, temperature, weather and alignment may be carefully controlled, and no mud is present to foul the belts, there is little assurance such a device would work under well logging conditions and on wirelines in various states of cleanliness, age and corrosion. Further, such devices are not required to drive a recorder in correspondence with the movement of the wireline.

It is therefore a still additional object of the present invention to provide method and apparatus for providing signal representative of the movement of a wireline used for lowering a borehole tool in a borehole under varying wireline measurement conditions, with the signal being suitable for driving a recorder to move in correspondence with the wireline movement.

The type of accuracy of wireline length measurements required by industry in selling new wireline or in cable tool drilling to roughly determine the depth of a borehole is somewhat less demanding than depth measurement requirements for well logging. Further, in industrial and drilling operations, there is little need for repeatable measurements. In well logging, the necessity for repeatable depth measurements is now more important than ever, not just because boreholes are deeper, but additionally because more runs are being made on each borehole and measurements for each run must be accurately depth merged with one another to enable processing via computer. In such merging and processing, it is important that measurements obtained from a given point in a borehole on one run be merged accurately with all additional measurements obtained from the same point on other runs. For this to be done, the depth signals used to drive the recorder on each run must be highly repeatable, not only so starting points of each recording correspond, but also so that the same number of samples be produced as a function of the depth signals on each run between any two points along the borehole.

It is therefore an object of the present invention to provide method and apparatus for providing a repeatable signal suitable for driving a recorder for depth recording measurements from different runs in and out of the borehole, such that these measurements can be accurately depth merged. Depth recording as used herein, is defined as recording measurements obtained from a borehole tool in correspondence with a depth indication for the tool derived from wireline measurements. By example, measurements obtained from the tool may be sampled and recorded at fixed increments of depth or wireline movement with the depth of at least one sample known and therefore the depths of all other samples readily computable. By further example, measurement from the tool may be obtained at fixed or random times, and recorded along with the depth indication for the tool at that time.

SUMMARY OF THE INVENTION

Accordingly, method and apparatus are described for providing a repeatable signal representative of movement of a wireline under varying wireline mesurement conditions. This repeatable signal is particularly suitable for driving a recorder used for depth recording measurements from a borehole tool lowered in a borehole on the wireline. Accurate depth merging of measurements recorded from different borehole tool runs can be accomplished despite variations in wireline measurement conditions which typically produce slippage of mechanically coupled measurement devices.

In one embodiment, signals are produced corresponding to different types of wireline movement measurements. These measurements are made at generally the same point on the wireline. These signals presumably correspond to the same movement of the wireline if produced under ideal measurement conditions. However, when wireline measurement conditions vary, it can be presumed that one of the signals may deteriorate and not correspond to or repeat with the movement of the wireline. Accordingly, the signals are automatically utilized to provide a repeatable signal representative of the wireline movement even when wireline measurement conditions are less than ideal.

In one form of the invention, a first type signal is produced from a wireline measurement wheel tangentially coupled to the wireline for rotation with movement of the wireline. In this manner, first type signals correspond to incremental movement of the wireline at the wheel. Second type signals correspond to magnetic marks regularly placed on the wireline at selected intervals. The first type signal is prone to slippage and other variations. However, and in accordance with this invention, by counting the number of measuring wheel increments for the intervals between the magnetic marks, the slippage may be detected, appropriate alarms indicated, and/or automatic corrections provided.

Of course, where wireline tensions are substantially different from those present during the placement of the magnetic marks, it is desired to correct the incremental signals back to this reference condition before utilizing the magnetic marks. Also, where the measuring wheel differs in circumference by a calibration factor from a standard circumference used to place the marks, it is desired to correct for this calibration factor. Accordingly, appropriate circuits are described.

A further feature of this invention is in the utilization of depth signals to drive a recorder of the type having previously recorded depths. The previously recorded depths may be utilized, for example, to place depth numbers on a film or they may have been recorded on magnetic tape on a previous run and are utilized to record subsequent runs in depth correspondence. In any case, it is desired to change these recorded depths in correspondence with the movement of the wireline and, more particularly, in correspondence with the depths of a borehole tool lowered in the borehole on the wireline. Accordingly, signals are produced corresponding to the recorded depths during the driving of a recorder and utilized to control the recorder driving so that the recorded depths and borehole tool depths correspond to one another. Allowance is made for recorder depths and tool depths to differ temporarily when the changing of the tool depths exceeds a maximum safe speed for changing the recorder depths. A further feature indicates when the recorder depths and tool depths correspond such that measurements from the tool may be properly depth recorded.

The automatic detection and correction of slippage, whether real, or apparent as produced by faulty electronics, for example, overcomes a problem where operator-applied corrections introduce nonrepeatable and often erroneous results. Special circuits provide corrections for variations in measurement wheel calibration factors, wireline tension and downhole tool weight that enable accurate restoration of the incremental movement signals back to the control reference conditions used to place the magnetic marks on the wireline. These circuits may also be used to correct non-standard wireline marking conditions, such as exist at the well site, to standard reference conditions and place the marks on the wireline.

An additional feature is a correction circuit which provides an economical advantage in that only a minimum number of digital input devices; e.g., thumb wheels or the like, are needed. Of course, fewer digits also means less likelihood of error. Previously, since correction factors associated with wireline measurements have on the order of five or six significant digits; e.g., they may take the form 1.000XX, a similar number of digital devices were required. However, by separating out the non-zero, least significant digits, such as XX in the factor above and using scaling counters having scales of $10^{P1}$ and $10^{P2}$ where P2 is the number of non-zero, least significant digits (here, two) and P1 = n − P2, where n is the total number of digits to the right of the decimal point (here, five), only two digital devices are required.

The recorder drive feature allows for high speed movement of the wireline and borehole tool in the borehole, as for example, to reach logging depths. This may be done without the restrictions normally imposed by a recorder which cannot keep depth correspondence at such speeds. Accordingly, signals are produced corresponding to both borehole depths and recorder depths. If these signals differ, the recorder is driven at a safe speed until the depths correspond. Meanwhile, the tool may be not moving at all, or even moving in a different direction.

In combination, the above features provide an automatic system for producing signals representative of wireline movement under varying conditions which repeat from run to run and free the operator from confusing and extraordinarily demanding manual intervention. More particularly, this system provides a repeatable signal free from inconsistent operator performance. The signal is utilized to drive a recorder for recording measurements from borehole tools run on a wireline so that their recorded depths correspond to one another.

For a better understanding of the present invention together with other and further objects thereof, reference is made to the following description taken in conjunction with the accompanying drawings, the scope of the invention being pointed out in the appended claims.

BRIEF DESCRIPTION OF FIGURES

FIG. 2 shows a schematic representation of the wireline depth measurement system of the present invention.

FIG. 6 shows a timing diagram; and

FIG. 7 shows a correction circuit corresponding to the circuits illustrated in FIG. 3.

DESCRIPTION OF THE PREFERRED EMBODIMENT

Figure 1B:
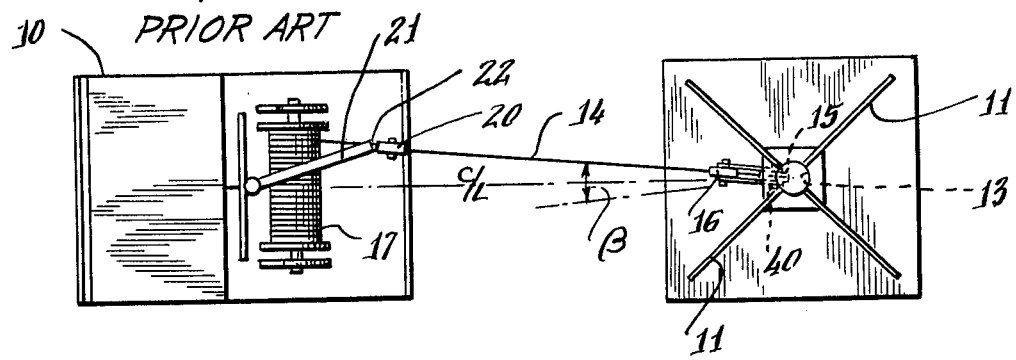
FIG. 1A shows a side view and FIG. 1B a top view of a typical well site set up for depth recoder, wireline spooling, measuring wheel, support and alignment sheaves and borehole tool.
Figure 1A:
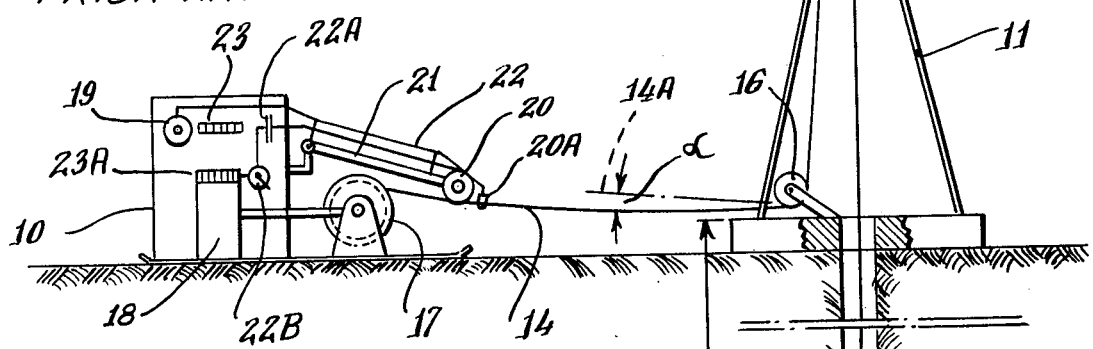

Referring now to FIG. 1A, there is shown a mobile laboratory unit 10 set up near a derrick 11 to lower a borehole tool 12 into a borehole 13 on the end of a wireline 14. The borehole tool 12 may be, for example, a logging sonde for investigating the formations traversed by borehole 13. The wireline 14 from which the borehole tool 12 is suspended runs over a support sheave 15 suspended from the derrick 11 and over a bottom sheave 16 aligned with a winch 17 mounted on unit 10. While in use during logging, the wireline is guided on and of the winch 17 by spooling arm 21 arranged over winch 17. To measure the depth of borehole tool 12, wireline movement on the surface is measured by means of a detection device 20 mounted at the end of spooling arm 21. The detection device 20 is guided along the wireline as the spooling arm swivels laterally to guide the wireline spooling, as can be seen from the top view in FIG. 1B.

The wireline detection device 20 shown in FIGS. 1A and 1B is of a well-known type. A measurement wheel 20 rides along the top of the wireline 14, its weight and perhaps additional pinch wheels, not shown, mechanically couple the wheel to the top side of the wireline. A mechanical linkage 22 couples its rotation through a clutch 22A to a mechanical depth indicator 23 and perhaps to a recorder 18. A hand crank 22B in the linkage allows adjustment of depth indicator 23 and a recorder depth indicator 23A. Recorder 18 is electrically connected to conductors in the wireline through slipring collector on winch 17.

In some cases, magnetic marks previously placed on the wireline at regular intervals, such as every 100 feet, may be detected at magnetic mark detector 20A, and electrically connected to a mark indicator 19, usually in the form of a bell. Placement and use of these marks is described in U.S. Pat. No. 3,566,478 issued to D. F. Hurlston on Mar. 2, 1971.

Briefly, while running the wireline in and out of the borehole, an operator is expected to maintain the same lower significant digits; i.e., ones and tens digits, on indicator 23 by adjusting hand crank 22B when a magnetic mark is indicated. This manual adjustment thereby corrects for slippage of wheel 20 occurring between these detected marks. As already discussed, if slippage is excessive or allowed to accumulate over several mark intervals, it is possible for the operator to confuse one mark for another and make the adjustment incorrectly.

It is well known that varying wireline measurement conditions, such as mud coating on the wireline or the measurement wheel cause wheel slippage on the wireline and affect the wheel measurement. However, it is now recognized that curvature of the wireline path at the point of measurement also affects the measurement. Further, changes in the wheel-to-wireline contact pressure cause small, short-term variations. A curved path, as shown in FIG. 1A by an angle $\alpha$, may result from sag in wireline 14 between winch 17 and lower sheave 16 during periods of low wireline tension. Changes in tension tend to accelerate the wireline and measurement wheel in a vertical plane changing the degree of curvature as well as bouncing the measurement wheel 20 on the wireline.

As shown in FIG. 1B, the spooling of the wireline 14 on winch 17 also causes wireline path curvature and acceleration forces. During spooling, spooling arm 21 swivels laterally across winch 17, forcing the proper placement of wireline 14 on winch 17. Considerable lateral forces are required to deflect the wireline at an angle $\beta$, shown in FIG. 1B, from a center line. These forces are extreme when the wireline is held against the flanges of the winch in order to start each new layer. Since these lateral spooling forces are applied at the end of the spooling arm 21, the wireline path can be expected to curve at the point where the force is applied.

As previously discussed, many of these problems could be avoided by using the vertical section of wireline just above the top of the borehole, if it were not for the borehole tool clearance requirements associated with well logging. However, in accordance with this invention, these problems are overcome while still meeting this requirement and providing the advantages of operator visibility and short recorder linkages in having the measurement device at the end of spooling arm 21.

Referring now to FIG. 2, there is shown in schematic form some features of the present invention and how they may be integrated into a depth measurement system. In contrast to the single wheel 20 of the prior art riding on top of wireline 14 as shown in FIG. 1A, substantially identical wheels 135 and 140 are employed on opposite sides of the wireline. The details of this preferred measurement wheel arrangement are described in copending application Ser. No. 706,106, by Lavigne, et al., co-filed on July 16, 1976, with the present application.

Briefly, this arrangement comprises slidably mounted measurement wheels which ensure tangential engagement of opposite sides of the wireline with equal pressure. A low-torque-load signal generator responsive to rotation of one of the wheels generates electrical pulse signals corresponding to incremental movement and direction of the wireline. In one embodiment, signal generators, responsive to the rotation of opposing wheels, provide independent signals, each ideally corresponding to the movement of the wireline engaged between them. However, since slippage or faulty electronics may vary the signals corresponding to one of the wheels, these signals are automatically processed to provide alarms and corrections for non-ideal wireline measurement conditions.

While the two measurement wheels and processing signals described in this regard are preferred in the performance of this invention to produce a signal corresponding to the movement of the wireline, the features of this invention are not limited thereto and are applicable as well to single wheel-single signal techniques as will be appreciated herein.

It will be appreciated that the slippage compensation provided by the two-wheel system is not of the same type as provided by this invention. For example, no provisions are made for tension corrections nor would they be appropriate in the above independent signals since both wheels measure the wireline under the same tension.

A chassis 24 is supported and guided on wireline 14 by sets of guide wheels assemblies 40A, 40B and 40C and prevented from rotation or movement along wireline 14 by connections to spooling arm 21 at block 30. The chassis 24 in turn pivotally supports mounts 94 and 97 upon which wheel carriges 100 and 101 slide. This arrangement prevents most lateral spooling forces being transferred from spooling arm 21 from being exerted on wheels 135 and 140. The details of these pivotal supports will not be described herein.

Lateral spooling forces transmitted from spooling arm 21 to block 30 are applied to wireline 14 by two vertical guide rollers 36 and 37. Common to a plane including rollers 36 and 37 is a vertical pivot, not shown in FIG. 2, but described in the above copending Lavigne, et al. application. This pivot allows chassis 24 to swivel and align itself along wireline 14 as guided by guide wheel assemblies 40A through 40C. Since lateral spooling forces will be exerted on the wireline at rollers 36 and 37, which are on one side of guide assembly 40B and measuring wheels 135 and 140 are on the other side, there will be little curvature of the wireline at these wheels.

Further, as will be appreciated form the description provided in the above co-pending application, the pivotal nature of supports for mount 94 at 91 and 92 and mount 97 at 96 to chassis 24, slidably mounted carriages 100 and 101 and biasing means included in these mounts cooperate to yield to any unbalanced lateral forces at the wheels. Both wheels simply slide to one side on the slidable mount in response to any unbalanced lateral force; i.e., a force applied on one wheel and not on the other. This sliding relieves any unequal or unbalanced force and maintains the normal self-balancing biasing forces. Since no unbalanced forces are possible and only the controlled biasing forces can be exerted on the wireline by the wheels, wireline measurement conditions are produced, which allow either wheel to provide a repeatable signal representative of movement of the wireline between the wheels.

Two low-torque signal generators 136 and 137 responsive to the rotation of measurement wheels 135 and 140 respectively produce two signals each corresponding to wireline movement at the point between the wheels. These signals presumably would correspond to the same movement of the wireline, at least under ideal wireline measurement conditions. However, as previously discussed, there are random and short period variations of wireline measurement conditions which would not be detected by the most alert operator. For example, even substantial slippage errors from one of the wheels would not be noticed until a magnetic mark was detected. Only then could the slippage be corrected by the usual hand crank adjustment. Since such a correction is made manually, some time after it occurs, and since it is unlikely that the same slippage will occur at the same depth on each run, manually corrected depth measurement signals cannot be expected to repeat. Not only will the slippage between each magnetic mark interval vary from run to run, but the method of applying the correction may vary for each interval and even for corresponding intervals on different runs. Therefore, in order to provide repeatable depth measurement signals, it is important to automatically and systematically detect slippage as it occurs as provided by this invention. It is also important to take appropriate and immediate corrective action as provided by a further feature of this invention. However, it will now be necessary to review briefly the nature of optical encoders used as low-torque signal generators in conjunction with directional sensing circuits.

As shown in FIG. 2, such an encoder may be used in conjunction with either wheel 135 or 140 as shown at 136 and 137. Each encoder generates two channels of signals such as described in the above Hurlston patent and as illustrated by lines 180 and 181 for signal generator 136 which responds to the rotation of the right wheel 135 as shown in FIG. 2. As described in the above patent, the relationship between these two channels enables the determination of the direction of rotation and output of a single series of pulses. It will be appreciated that these series of pulses may be directed to separate outputs and appear as negative pulses when the wheel is rotated corresponding to decreasing depths as for example, when the wireline is moving out of the borehole, or as positive pulses when the wireline is running in the borehole. Signal generators of this type are well known and typically provide pulses corresponding to one-half inch increments of the measuring wheel circumference.

Due to manufacturing problems, it is unlikely that any two measurment wheels can be made to be exactly identical. It is less costly, and therefore more practical, to provide for electronically calibrating each wheel to a desired standard, particularly since it is a straightforward process to determine the calibration factors required to bring the wheel to this standard. Therefore, as shown in FIG. 2 at block 301, a correction circuit such as shown in FIG. 7 to be described later is employed to calibrate the wheel to this desired standard. A corresponding calibration circuit is shown for the left wheel 140 at 303. After such individual calibration, the signals corresponding to rotation of wheels 135 and 140 presumably correspond to the same movement of the wireline under ideal conditions. Of course, it is understood that, if conditions deteriorate from ideal such that slippage of one of the wheels occurs, these signals will not correspond. Accordingly, it is a feature of this invention to automatically utilize signals of this type to provide a repeatable signal representative of the wireline movement when wireline measurement conditions are less than ideal.

As shown in FIG. 2, two signal generators 136 and 137 responsive to the rotation of measurement wheels 135 and 140, respectively, produce two signals each corresponding to the wireline movement at a point between the wheels. If desired, these signals are calibrated to correct for differences between the wheels and a desired standard. Either of these signals may be automatically utilized to provide features of the present invention. Further, these signals may be processed in accordance with the previously mentioned copending Lavigne, et al. application and utilized in accordance with the present invention.

Briefly, the processing described in the co-pending Lavigne, et al. application, utlizes independent left and right measurement signals which are processed to see if they compare. If they agree within a small percentage, it is an indication that both wheels are operating under similar and repeatable wireline measurement conditions. In this case, the measurements may be simply averaged. If, however, one wheel appears to be rotating faster than the other, the less rapidly rotating wheel may be slipping and cannot be expected to repeat. An appropriate indicator, 352 or 353, as shown in FIG. 2, is then activated to alert the operator that the corresponding wheel is slipping. Further features provide for automatically selecting the faster rotating measurement wheel as the repeatable measurement.

Referring again to FIG. 2, a general description of how repeatable depth signals may be utilized will be given now. In accordance with the present invention, separate series of pulses are generated for the up (negative) and down (positive) directions, which are corrected, if desired, for measurement wheel calibration factors. These $\pm\delta l_{mc}$ pulses correspond to small increments of wireline movement (plus for increasing depths going in the borehole, and minus for decreasing depths coming out) and are corrected for differences in tension between the actual tension measured at 40 just above support sheave 15, and a desired reference tension $T_R$ according to well known relations utilizing an elastic coefficient E for the particular wireline. This provides increments corresponding to wireline movement as it would be measured under the known reference conditions at the surface and produces signals corresponding to $\pm\delta l_R$ shown as output of block 540 of FIG. 2.

Magnetic marks previously placed on the wireline may be detected at 20A or alternately at 147 as shown in FIG. 2 and connected to activate mark indicator 19 in the usual manner. However, these marks may also be used to control the accumulation in counter 315 of the $\pm\delta l_R$ pulses output from block 540. In this manner, the number of pulses corresponding to the interval between each magnetic mark is accumulated and compared with the number normally expected. A deficiency in $\delta l_R$ increments corresponds to slippage of a mechanically coupled wheel as compared to the magnetic marks and can be detected as shown at 550 and indicated at 332. Deficient $\delta l_R$ increments can also be added to the existing $\pm\delta l_R$ pulses to provide automatic slippage corrected pulses $\pm\delta l_{Rc}$.

Magnetic marks may be placed on the wireline using the above $\delta l_R$ pulses input to block 550 of FIG. 2 by accumulating the pulses until the number corresponding to the interval between magnetic marks is obtained. Then the magnetic marking circuit 548 is triggered. When switch 549 is in the ON position, electromagnet 163 will be pulsed to place a magnetic mark at that point on the wireline which has been previously erased by solenoid 160.

After further correction for elongation of the wireline between the surface and the borehole tool due to the tension $T_B$ caused by the weight of the wireline tool as shown at block 340 of FIG. 2, pulse signals are added during descent and subtracted during raising of the borehole tool to provide its depth as indicated at block 580 of FIG. 2 or compared at block 582 to similar incremental pulses from recorder 588 to synchronize the recorder depth 594 with the borehole tool depth. Also shown in FIG. 2 is a mechanical backup system 80 much as described in regard to FIG. 1A consisting of measuring wheel and mechanical linkage 22 which may be coupled by means of clutch 22A and hand crank 22B to mechanically drive recorder 588. Since this system is entirely mechanical, it could be used in case of a failure such as a complete lack of electrical power. Now that the utilization of depth measurements has been generally described, a detailed description of tension and elongation corrections will be provided. For a theoretical background, see U.S. Pat. Nos. 3,027,649 issued on Apr. 3, 1962 to R. W. Sloan and 3,490,150 issued on Jan. 20, 1970 to W. A. Whitfill, Jr. Both patents provdide systems to implement tension corrections and assume the measurement wheel, once calibrated, provides indications of exact length of the wireline at the wheel. The Sloan patent describes an analog system where magnetic marks are used to provide a comparison or check upon the calculated value of the reference length and modify the calculated value. Since no mention is made of slippage of the measurement wheel in this regard, it is presumed that this check and correction is necessary because of the analog nature of this calculation.

Previously mentioned Hurlston patent is an attempt to provide a more practical device. The present invention is also directed towards this goal while solving problems related to slippage of the measuring wheel and to driving recorders for repeatably recording measurements from borehole tools; i.e., with a repeatability such that measurements from a borehole tool on a subsequent run are recorded in depth correspondence with depths and measurements previously recorded on prior runs.

The accuracy and repeatability of depth measurements for well logging tools are characteristics which are taking on increasingly greater importance as more widespread use is made of automatic computer processing of log data. To meet these requirements, many approaches have been developed. Thus, for example, in the previously mentioned Hurlston U.S. Pat. No. 3,566,478, is described a technique for ensuring the repeatability of successive depth measurements and involving magnetic marking of the wireline during a first lowering of the tool into a borehole. This technique comprises essentially three stages:

measuring the length of the wireline unreeled or reeled in on the surface so as to know the depth of the tool with an accuracy of about one part per thousand;

automatically generating an elasticity correction term for the wireline length thus measured and calculating the wireline reference length which would have been unreeled on the surface if the tension actually existing during measurement had been equal to a given reference tension;

applying a magnetic mark on the wireline whenever the reference length thus calculated equals a whole multiple of a given reference interval (100 feet, for example).

In addition to the above three stages used during the lowering of the tool into the borehole, there is a tool-raising stage consisting of:

generating, by means of a nomogram, a wireline reference length elongation correction term so as to be able to calculate the true depth at which the tool is located taking into account the tension actually applied to the wireline.

In addition the operator must use the magnetic marks as described in this patent and previously discussed herein to manually detect slippage, when possible, and then attempt correction. It should be appreciated that, in addition to the problems already discussed, the above tension and elongation corrections change the particular depth number references corresponding to these marks and these change in turn with changes in these corrections.

Like the operator, prior art digital or pulse wireline measurement and tension correction devices must consider whether any correction should be added or subtracted, which of course changes with the direction of wireline movement. In the past, switches or the like have been used to direct the addition or inhibition (for subtraction) of the correction pulses. In accordance with one feature of the invention, provisions are made for two series of pulses, one corresponding to downhole movement of the wireline or increasing depth and therefore regarded as positive (+) and the other corresponding to uphole movement or decreasing depth and therefore regarded as negative (−) pulses. Further, it is provided that each of these series be corrected for calibration, tension, temperature, elongation and the like, in accordance with their algebraic sign. Therefore, at any given instant, regardless of direction, the number of previous passes through a given zone, or the alertness of the operator, accurate depth indications may be used to mark the wireline or to automatically, upon detection of each mark, apply a slippage correction if required.

It is generally preferred that measurements carried out in boreholes be recorded on a photographic film as a function of depth, the film reel being driven directly by a transmission shaft 22 connected mechanically to a measurement wheel 20 over which the wireline runs. Between this transmission shaft and the film reel is placed a manually operated clutch 22A which makes it possible to disconnect the reel from the shaft. In addition, the transmission shaft is constantly connected to the depth writing reel which forms an integral part of the recorder and to a depth indicator placed on the outside of this same recorder.

In addition to the above shafts and reels, the recorder also includes mechanical shutters and a device for projecting depth numbers on the film in sequence; e.g., 1100, 1200, 1300, etc., to 9900. This depth number projecting device usually cycles once every 10,000 feet, and consequently, for boreholes less than ten thousand feet, must accompany in depth correspondence, the descent of the borehole tool from depth zero to the total depth of the borehole. For boreholes deeper than 10,000 feet, the recorder may be attached to the recorder drive at the last 10,000 foot interval and accompany the tool thereafter, changing its recording depths in correspondence with borehole depths.

Because of these mechanical and photographic features, and other electrical devices not described which are linked to the recorder, the recorder should not be driven beyond certain maximum safe speeds, which unfortunately are far slower than those corresponding to safe wireline speeds, particularly for cased holes. Consequently, expensive rig time must be used to run borehole tools in and out of the borehole at much slower speeds required by the recorder.

Recorders using magnetic tape have similar problems, particularly those of the preferred incremental or stepping type. Here, factors inherent to tape transport and reading speeds determine the maximum tape speed and the corresponding speed limit for wireline movement. Further, where these recorders are used to depth merge; i.e., record in depth correspondence measurements from different runs in the borehole, the tape and measurements recorded versus depth from previous runs must follow in depth correspondence the tool down the borehole, like the depth projection system of the film recorder and also limit the speed for wireline movement.

However, in accordance with this invention, these problems are overcome by utilizing the previously described series of incremental pulses. Pulses are accumulated to provide a depth indication corresponding to the borehole tool. Similar pulses corresponding to the recorded depths associated with the recorder are also accumulated and the recorder driven as a function of the difference in these depth indications. The depth indication difference is allowed to increase once the recorder has reached its maximum safe speed and thus in no way limits speeds for the wireline movement. When the wireline speed subsequently falls below the corresponding maximum safe speed for the recorder, the depth indication difference then begins to decrease until the two depth indications are in correspondence to one another. At this point, the recorder is ready for a recording in depth correspondence new measurements from the borehole tool.

The following previously known equation will be used to give the true depth of a tool lowered in a borehole by means of a wireline:

$$L_t = L_m - \int_0^{L_R} E(T_S - T_R)\,dl + E(T_M - T_R) \cdot L_R \quad (1).$$

(1st correction term)   (2nd correction term)

In this equation:
$L_t$ is the true depth sought,
$L_m$ is the length of wireline unreeled, measured at the surface by a low-load measurement sensor under a tension at the surface of $T_S = P + T_B$, where P is the weight of the wireline unreeled and $T_B$ the downhole tension applied to the lower end of the wireline, (P is adjusted for buoyancy of course), $L_R$ is the reference length this unreeled wireline would have if it were subjected uniformly to a reference tension, $T_R$ and $T_M$ is the theoretical average tension borne by the wireline lowered into the borehole, that is, $T_M = (T_S + T_B)/2 = T_B + P/2$.

The first correction term of the equation (1) above is the reference length correction which must be applied to the measured length $L_m$ to furnish the reference length $L_R$.

In practice, this reference length $L_R$ is calculated by the accumulation of wireline unit reference movements or increments:

$$L_R = \Sigma \delta l_R \text{ where } \delta l_R = \delta l_m \cdot E(T_S - T_R) \qquad (2)$$

In this equation $\delta l_R$ is a unit reference movement corresponding to a quantized reference length measurement pulse and $\delta l_m$ is a measured unit movement corresponding to a quantized gross length measurement pulse produced by the measurement sensor. By quantized, it is meant the pulse can be counted as one corresponding measurement unit or increment of movement. As regards the calculation of the increments $\delta l_m \cdot E(T_S - T_R)$, it consists in producing a new quantized output pulse each time the product of the expression $E(T_S - T_R)$, previously converted into a constant digital signal, by the number of quantized gross length ($\delta l_m$) measurement pulses received since the delivery of the preceding output pulse, equals a length quantum. Under these conditions, the equation (1) can also be written $$L_t = L_R[1 + E(T_M - T_R)] \qquad (3)$$

In practice, the true length $L_t$ of the wireline is obtained by the accumulation of increments of true length $\delta l_t$ and calculated as follows:

$$L_t = \Sigma \delta l_t = \Sigma \delta l_R + \Sigma E \cdot T \cdot \delta l_R + \Sigma E \cdot L_R \delta T \qquad (4)$$

In this equation $T = T_M - T_R$ and $\delta T$ is an increment of either sign of the difference between the average tension $T_M$ of the wireline and the reference tension $T_R$. It will be noted here that this reference tension $T_R$ is in general a constant but that it is possible to have $T_R$ take on values which evolve, notably by steps, as a function of the length of wireline unreeled so as to always keep the difference $(T_S - T_R)$ and hence $T_M - T_R$ within a given range. Under these conditions, two series of quantized true tool displacement ($\delta l_t$) pulses of either sign, are produced by adding, as a function of their sign, the quantized reference length ($\delta l_R$) pulses, if necessary corrected for slip ($\delta l_{RC}$), those relative to elongation due to wireline length variations ($ET \cdot \delta l_R$) and those relative to elongation due to wireline tension variations ($E \cdot L_R \delta T$). To have the true tool depth, it is sufficient to algebraically add the pulses $\pm \delta l_t$.

It is also easy, on the basis of the quantized true tool displacement ($\delta l_t$) pulses thus calculated to have the depth meter of the measurement recorder take on, by slaving, a repeated increment identical to this calculated true movement.

Moreover, during a first lowering of the wireline, when the magnetic marks have been applied at given reference length intervals, we have, for the next raising and for any subsequent lowering and raising, a stable depth reference to which, by means of the described slip correction, the corrected reference lengths and the true depths are constantly related. it is thus possible from a measured length furnished by a wheel whose relative slip would be $10^{-3}$ (or rather the difference between the relative slip of the measurement wheel during the marking operation and that of this same wheel — or of another wheel — during subsequent lowering or raising) to find the wireline reference length determined during the first lowering with an accuracy equal to $10^{-3}$ of the unit reference interval (that is, 10 cm if this interval is 100 m and 1 cm if it is 10 m) and to ensure the repeatability of the reference length used for the calculation of the successive true depths, with this same accuracy.

Recalling as explained in regard to FIG. 2, either encoder 136 or 137 may be used to produce a series of pulses which may be characterized as quantized gross length measurement pulses representative of the positive or negative increments $\delta l_m$ measured by a wheel which bears on the wireline 14.

Referring now to FIG. 2, encoder 136 corresponding to the right wheel has two outputs 180 and 181 connected respectively to two amplification and shaping circuits (not shown) whose outputs are connected to wheel calibration circuit 301 which will be described later in regard to FIG. 7, and to a directional logic circuit (not shown) having two inputs and outputs (S384 and S385 and S387 and S388, respectively, for the right wheel). The signals S384 and S385 are periodic rectangular signals whose frequency is proportional to the rotating speed of the measurement wheel 135. Signal S385 lags by a quarter cycle in relation to signal S384, as shown in FIGS. 6A and 6B, if the wheel 135 rotates in an up direction corresponding to raising borehole tool 12 in the borehole. If borehole tool 12 is lowered in the borehole, the wheel 135 rotates in the opposite direction and signal S385 leads by a quarter cycle with respect to signal S384, as shown in FIGS. 6P and 6Q. A directional sensing circuit generates electrical pulses on one output when the wheel 135 rotates in the up direction as shown in FIG. 6C at S387 and on another output if the wheel 135 rotates in the opposite direction, as shown in FIG. 6S at S388. Each electrical pulse corresponds to a rotating increment of the measurement wheel 135. A further description of this type of encoder and direction sensing may be found in the previously discussed U.S. Pat. No. 3,566,478 issued to Hurlston.

The output signals of encoder 137, corresponding to the left wheel 140, are similarly applied to amplifying and shaping circuits and to wheel calibration circuit 303, then in turn to a directional sensing circuit which generates electrical pulse on signals S393 in the up direction and on its output S394 in the down direction of wireline 14. Only the up direction signals are shown for the left wheel in FIG. 6 at G and H. Each electrical pulse is representative of a rotation increment of the measurement wheel 140.

The clock circuit 300 is designed to offset the time of the pulses capable of appearing simultaneously. As shown in FIGS. 6I through 6N, interrogations by the clock circuit 300 are carried out at a frequency higher than the maximum frequency of the pulses being generated by the directional sensing circuits. Incremental depth pulses, when present, are therefore offset with respect to time.

Figure 5A:
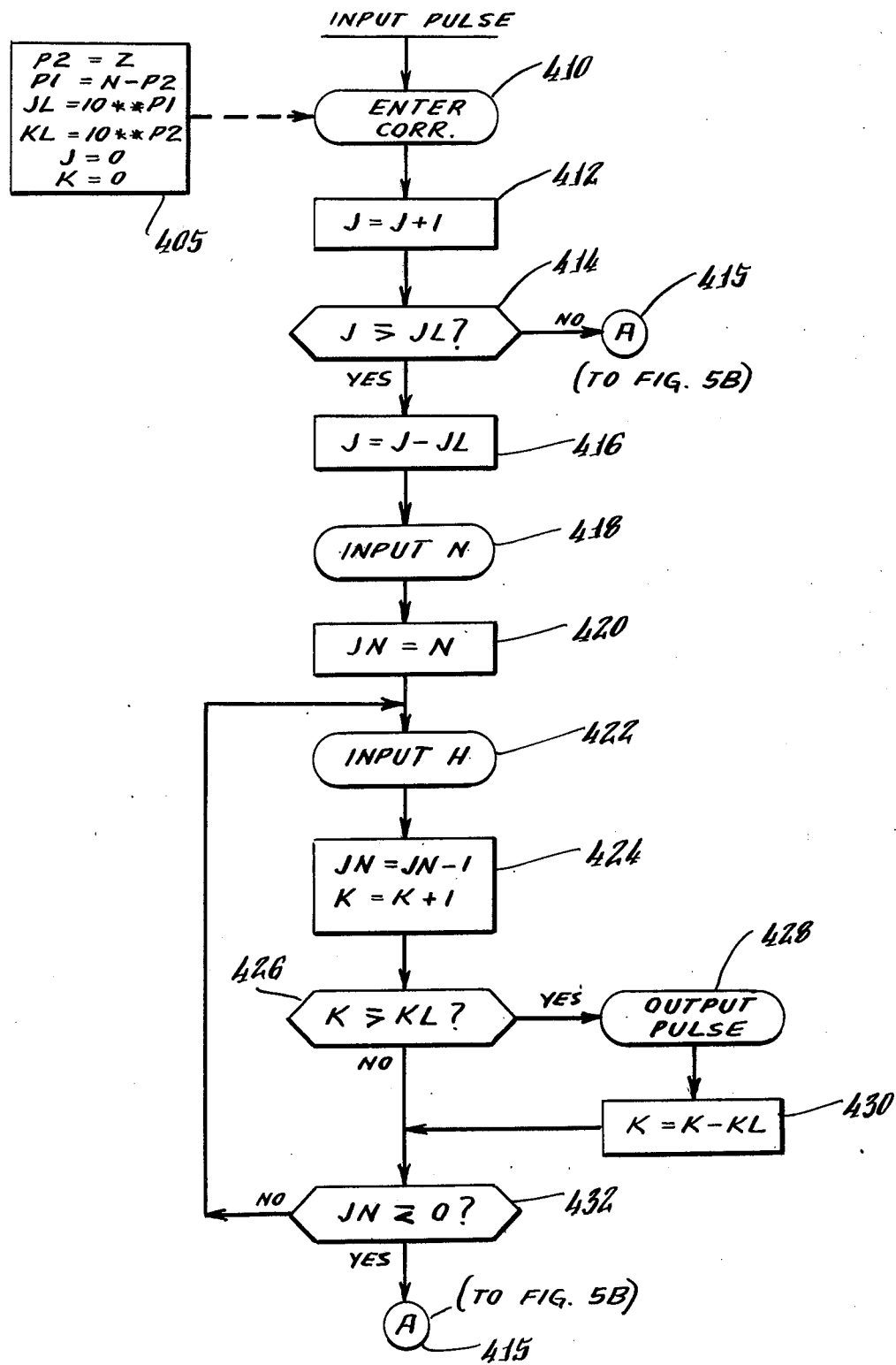
FIGS. 5A and 5B show signal processing flow diagrams.
Figure 5B:
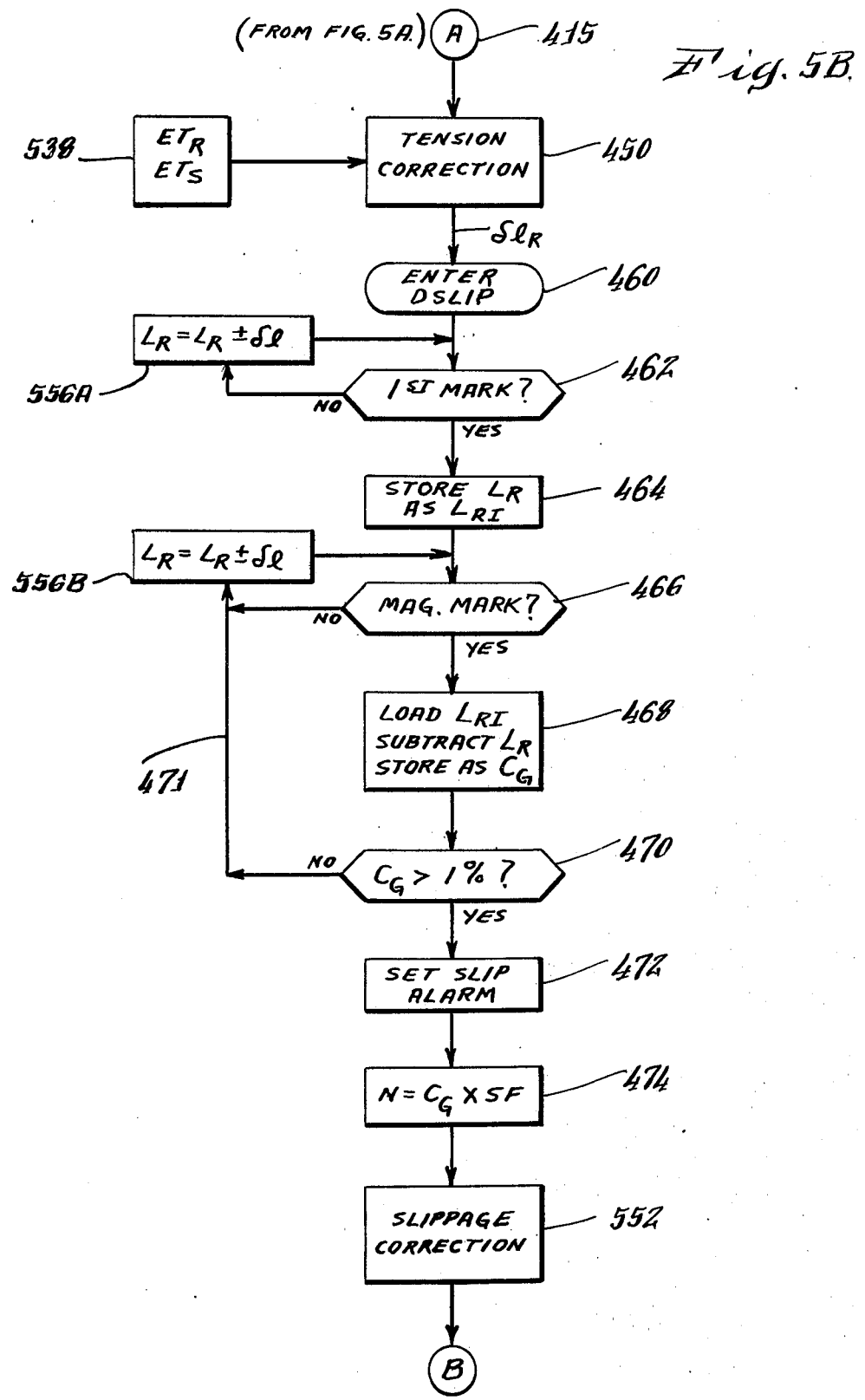

FIG. 5A diagrams the functions of a wheel calibration circuit such as those shown schematically at 301 and 303 of FIG. 2 and exemplified by the circuit diagram shown in FIG. 7. This circuit and its function will be described now. The circuit may be considered as correcting two series of pulses by adding in N additional pulses each time a preselected number of input pulses is accumulated. FIG. 5B diagrams a process which will be described later. As the process illustrated in FIGS. 5A and 5B may be readily performed on a digital computer or microprocessor, these figures are described in terms which would enable their programming.

It will be recalled that, due to manufacturing tolerances, wear, etc., measurement wheels such as 135 and 140 may be expected to differ in their circumferences from a standard calibration circumference. By means of calibration runs as against a standard wheel or with a calibrated wireline loop, these diferences may be determined. It is advantageous to express these differences as a variances factor such as $\pm$ N increments per $10^n$ where N and n are both integers. It is even possible to determine two values for N; N1 for a particular wheel when it is used in a positive sense, as for example, when running in the borehole, and a different number N2, when used in a negative sense, as for example while moving wireline out of the borehole. With these factors predetermined, a correction circuit such as shown in FIG. 7 may be employed to perform the function as indicated in block 301 or 303 of FIG. 2 corresponding to left and right wheel calibrations.

It will be recalled that the correction is to be performed on a series of pulses such as generated by encoders 136 and 137. While correction circuits are available in the prior art for correcting such pulses, as for example, described in U.S. Pat. No. 3,753,294 issued Aug. 21, 1973 to Georges Attali, et al. and as described therein, they take the form of a bidirectional counter which counts the plus and minus pulses in corresponding directions while continuously comparing its contents with a preselected digital number. Upon equality, a single pulse is output and the counter reset. This type of correction circuit may be said to operate by adding or substracting one pulse per $m$ pulses, where $m$ is a number defined by several digits. Further, $m$ generally has unusual values which make it difficult to remember. In contrast, circuits shown in FIG. 7 and diagrammed in FIG. 5A add or subtract N pulses per $10^n$. Since n may be varied with circuit design, N may be advantageously kept to a range of 1 or 2 digits, which not only makes it easier to use but makes the digital input device much less expensive.

Referring now to FIG. 5A and as indicated at 410, the correction process begins as indicated at block 412, by incrementing a first counter J whose contents, along with the contents of a second counter K was initialized to zero as shown at block 405. As also shown at block 405 two circuit design parameters P1 and P2 are defined such that their sum equals n. P2 corresponds to the number of digits in N.

By example, let N have two digits, then P2 = 2, P1 becomes $n - P2$; and where $n = 5$, P1 = 3. The two corresponding counter limits JL and KL may also be defined as $10^{P1}$ and $10^{P2}$. In the example illustrated in FIG. 5A the overflow limits for counter J with P1 = 3 is JL = 1000 while for counter K with P2 = 2 it is KL = 100.

As shown at block 414 of FIG. 5A, after incrementing, the contents of counter J is tested against its overflow limit JL and if no overflow is found as indicated by a NO answer, the process continues at point A as shown on FIG. 5B, which will be described later in regard to the slippage detection and correction process. If J has counted to JL, the test shown in block 414 answers YES and counter J is decremented by JL as shown in block 416. Then, in contrast to the prior art correction circuit described in Attali, et al., a small integer N (here having two digits) is input as shown at block 418 and transferred to reference counter JN shown in block 420. Then, as indicated in block 422, a high frequency clock pulse H is input. This may be generated, as for example, by clock 300 shown in FIG. 2 and illustrated in the timing diagram corresponding to FIG. 6I.

Each clock pulse causes counter JN to be decremented by 1 and counter K to be incremented by 1 as shown at block 424 of FIG. 5A. In turn, the contents of counter K is tested against its overflow limit KL as shown in block 426. If no overflow occurs, the process continues by testing JN for zero as shown at block 432. If JN has not been decremented to zero at this time, the process continues with the input of another clock pulse H as shown at block 422. JN is again decremented and K incremented, until either counter K overflows as indicated by a YES answer for the test indicated in block 426, or JN reaches zero. In the first case, an output pulse results as shown in block 428, which follows by the decreasing of K by KL and the return to the testing of JN as shown in block 432. In the second case, when JN = 0 and provides a YES answer, indicating N clock pulses have been input, the process continues at point A of FIG. 5B to be described.

For example, let P2 = 2 corresponding to a two-digit N value of (11) taken from the only two non-zero least-significant digits of a calibration factor 1.00011 having five significant digits to the right of the decimal point; i.e., $n = 5$ as in the previous example. The overflow limits for the first stage counter J is thus 1,000 and 100 for the second stage counter K (PL = 3, P2 = 2, $n = 5$).

Each time counter J overflows, N = 11 pulses are output into counter K. Each time counter K overflows, one correction pulse is output. In this example, counter J overflows every one thousand pulses input to the correction circuit, each overflow causing 11 pulses to be input to counter K. After nine counter J overflows, counter K will contain 99 pulses. During the tenth counter J overflow, counter K will overflow and output one correction pulse. However, counter K will continue to receive more pulses from the 11 pulses corresponding to N, leaving a remainder of 10 pulses. These pulses accumulate with subsequent counter J overflows to 21, 32, — 98, etc., until counter K again overflows during counter J's 19th overflow and outputs an additional correction pulse. This process continues such that during $10^n$ pulses input to the correction circuit, counter J overflows $10^{P2}$ times, causing N × $10^{P2}$ pulses to be input to counter K, which cause counter K to overflow N times and output N pulses, since counter K overflows every $10^{P2}$ pulses.

It will be appreciated that counter K may be of the UP/DOWN type and that pulses corresponding to upward or downward wireline movement may be used to steer the counter to count up or down accordingly, rather than to simply count up counter K as described above.

It will be clear from the above that by proper selection of $n$, the number of digits for N may be limited, which provides a cost advantage for digital thumb wheels or the like necessary for inputting this number.

Referring now to FIG. 7, two series of electrical pulse signals $\pm \delta l_m$ are respectively applied to two inputs of a calibration correction circuit 255 whose functions are to achieve a multiplication by a predetermined calibration factor C where C corresponds to a number very close to unity but has five or six significant digits to the right of the decimal point, with only the last few least significant digits differing from zero. Another example of such a factor is the number 1.00003 where "3" is the number of interest. The least significant digits could have any integer value so will be considered as N and may be found by subtracting C from unity and scaling up the small difference remaining by factors of 10 until N appears as a whole number; i.e.; $N = (1-C) \times 10^n$, $N \geq 1$. In the above example $N = 3$ and $n = 5$. When applied correctly, there will e a difference of N pulses in the output of circuit 255 or very $10^n$ pulse input.

N may be supplied manually by only a one or two digit digital thumbwheel or the like. As shown in FIG. 7, provisions are made for two different N numbers, N1 and N2 such that a correction corresponding to $\pm \delta l_{mc} = \pm \delta l_m \pm \delta l_m (N1-N2) \cdot 10^{-n}$ results.

As an example and as described in regard to FIG. 5A, where $n = 5$, $P2 = 2$ and $P1 = n-P2 = 2$, an P1-decade add-subtract circuit 256 receives on its two inputs two series of pulses $\pm i$ and delivers on its two outputs one pulse $\pm I$ for $10^{P1}$ pulses $i$ received. Each output pulse $\pm I$ causes the introduction of two numbers N1 and N2 represented by a series of digits into the stages of a first (257A) and a second (257B) P2-decade adder-substracter respectively. The first (257A) of these adder-subtracters will then be in a + N1 state and receives for subtraction from synchronized clock circuit 300 pulses H with a relatively high frequency which bring it back to zero. Adder-subtracter 257B, in a −N2 state, receives in the same manner these same subtraction pulses H. Depending on the sign of the triggering pulse $\pm I$, these clock pulses, N1 and N2 in number, are transmitted, N1 for adding and N2 for subtracting (or vice versa) to another adder-subtractor 258 having $P2 = n-P1$ decades. Its outputs are synchronized by a signal S2, shown in FIG. 6K, delivered by clock circuit 300. On the two outputs of the circuit 258 thus appear pulses which satisfy the law $I_s = \pm i(N1-N2) \cdot 10^{-n}$. These pulses $\pm I_s$ and the input pulses $\pm i$ are applied, depending on their sign, to the inputs of two additional OR gates 260 and 261.

External links 259A and 259B between inputs of circuit 255 and OR gates 260 and 261 may be eliminated if only the correction pulses are desired. In the case of the calibration correction, the links are present and the output provides two series of pulses for the corrected length measurement $\pm \delta l_{mc}$. It will be noted that the input signals $\pm \delta l_m$ of circuit 255 may be synchronized by a signal S1 and the correction pulses produced by the adder-subtracter 258 synchronized by signal S2, these two signals S1 and S2 being delivered by the clock circuit 300 as shown in FIGS. 6I-K. Under these conditions, the correction pulses $\pm I_s$ thus provided do not coincide with the input pulses $\pm i$, which makes it possible to add them without error.

Correction circuit 255 is particularly suitable for corrections such as the wheel calibration described above. However, as will be seen in the description of FIG. 3 which follows, circuit 255 also serves as a calculation circuit, multiplying the input pulse series by a correction factor $\pm C$ which is close to unity. As explained above, the correction is applied by subtracting C from unity and scaling up the small difference remaining by n factors of ten until the least significant digits have become an integer N; i.e., $N = (1-C) \cdot 10^n$, where $N > 0$. In application, N correction pulses are provided every $10^n$ which are added to the input pulse series $\pm \delta l$ producing an output $10^n + N$ and correcting $\pm \delta l$ to $\pm \delta l(1 + C) \cdot 10^n$. Where two correction factors having the same number of digits are to be applied together, N1 and N2 inputs are provided as shown in FIG. 7.

Figure 3:
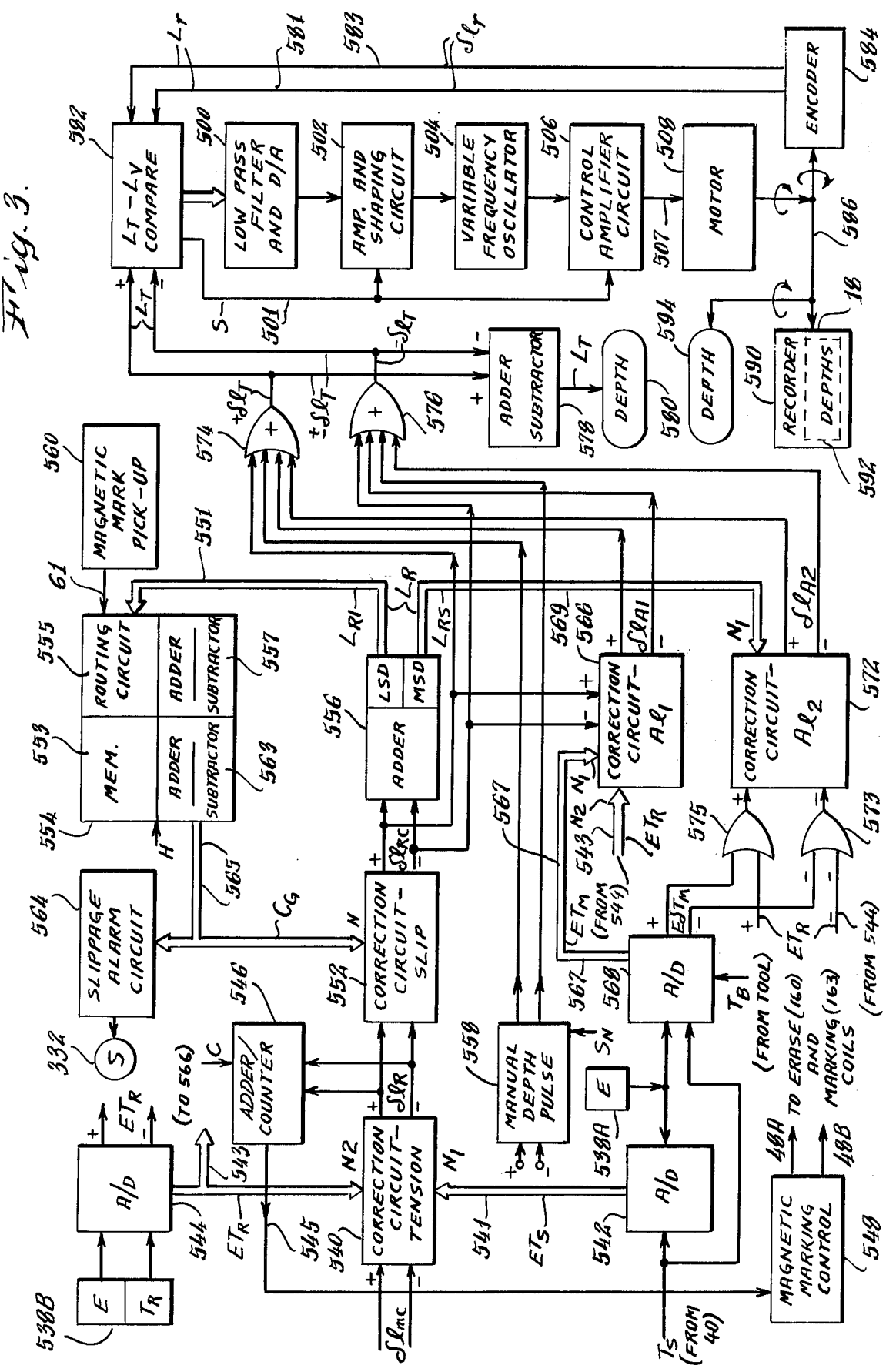
FIG. 3 illustrates circuit diagrams for method and apparatus in accordance with the invention.

The two seriees of pulses for the corrected gross length measurement $\pm \delta l_{mc}$ respectively delivered on the two outputs of a first correction circuit 255, applied as at 301 or 303 of FIG. 2 for wheel calibration calculations, are applied to the two corresponding inputs of another correction calculation circuit 540 like correction circuit 255. The calculation circuit 540 moreover receives two digital inputs (N1 and N2 of the circuit in FIG. 7). Referring now to FIG. 3, the N1 and N2 inputs are shown as two continuously present digital signals $E.T_S$ and $E.T_R$ expressed in $10^{-5}$ with three significant digits; i.e., $P2 = 3$, $n = 5$, $P1 = 2$. The N1 input ($E.T_S$) is delivered through a multiple link 541 by an analog-to-digital converter 542 of the continuosly operating type to which are applied the analog signal delivered by the tension measurement device 40 and through a manual control 538A; e.g., thumbwheel, the elasticity coefficient E of the wireline used. The N2 input ($E.T_R$) is delivered through a multiple link 543 by a second continuously operating type analog-to-digital converter 544 which has two inputs making it possible to manually introduce respectively the wireline elasticity coefficient E and the wireline reference tension $T_R$ at control 538B of FIG. 3.

The $ET_S$ and $ET_R$ terms above will be recognized as part of the first correction term $E(T_S - T_R)dl$ from equation (1). This term may be written as $(ET_S - ET_R)dl$ or $C_T dl$ where $C_T = ET_S - ET_R$. The calculation circuit 540 first carries out the multiplication of the $ET_S$ minus $ET_R$ tension correction digital signal $C_T$ by the pulses $\pm \delta l_{mc}$ and thus delivers reference length correction pulses of either sign, each time the product $\pm \delta l_{mc} \cdot C_T$ equals a length increment. These pulses are then added in accordance with their sign to one or the other of the two series of input pulses $\pm \delta l_{mc}$ to give respectively on the two outputs of the calculation circuit 540, two series of pulses for the reference length measurement $\pm \delta l_R = \pm \delta l_{mc}(1 + C_T)$.

The two outputs of the calculation circuit 540 are input to a reference interval adding circuit 546 designed to deliver a reference pulse for each group of reference length measurement pulses which corresponds to a unit reference interval. In the case where a measurement pulse corresponds to a length increment of 1 millimeter and a unit reference interval interval to 100 meters, the above group of pulses is $10^5$. For 1/10 inch pulses and 100 foot interval, the group is 12000. The reference pulses produced by the adder 546 are applied to a marking control circuit 548 with which is associated electromagnet 163 placed near a section of wireline 14 not far from the measurement wheels as shown in FIG. 2. The adding circuit 546 moreover has a manual control C for controlling, via a line 545, the application of a marking pulse to the circuit 548 shown in FIG. 3.

The two outputs of the calculation circuit 540 are moreover input to a third calculation circuit 552, like circuit 255 of FIG. 7 already described. Circuits 552-557 and 563-565 shown in FIG. 3 and to be described now, were shown collectively as slippage detection and correction circuit 550 in FIG. 2. Input to circuit 552 is a slip correction factor $C_G$ from calculation circuit 554, which will be described in greater detail below. $C_G$ is a digital signal expressed in $10^{-5}$ (like signal N1 or N2 of the circuit of FIG. 7, depending on the sign of $C_G$). Circuit 552 delivers on its two outputs two series of pulses relating to the measurement of the reference length corrected for slip $\pm \delta l_{RC} = \pm \delta l_R (1 + C_G)$. These two pulses $\pm \delta l_{RC}$ are applied to the two inputs (+) and (−) of an adder 556 having an output which delivers a digital signal representative of the reference length $L_R$ of the wireline unreeled into the borehole.

Before describing the slippage detection and correction circuits of FIG. 3, the corresponding process will now be described in conjunction with FIG. 5B. Beginning at point A continuing from FIG. 5A already described, block 450 of FIG. 5B illustrates the previously described tension correction. This correction process is detailed in 5A. While illustrated therein for wheel calibration, the process itself is general and may be applied as well for tension corrections using the terms $ET_R$ and $ET_S$ shown at block 538 of FIG. 5B as N1 and N2, used with the corresponding circuits shown in FIG. 7.

The slip detection routine DSLIP Inputs the $\delta l_R$ pulses as shown at block 460 of FIG. 5B and next determines as shown at block 462 if the first magnetic mark has been encountered. This mark is usually in the form of a visual, as well as magnetic, reference mark and is placed on the wireline a short distance from the tool attachment end. $\delta l$ pulses occurring before this mark are being counted and scaled as shown at block 556A to accumulate a reference length $L_R$ for the wireline as it begins its run into the borehole. Upon detection of the first mark as indicated in block 464 of FIG. 5B, this counting is interrupted for storage of the current count $L_R$. Only the least significant digits, as for example the 100, 10, 1 and 0.1 digits, are useful at this point and are stored as $L_{RI}$. The process then checks after each subsequent input increment pulse for the occurrence of subsequent marks as shown in block 466.

If none occurs, the counting of $L_R$ continues as shown at block 556B of FIG. 5B until one occurs. At this time, previously stored $L_{RI}$ is loaded into a digital arithmetic register as shown at block 468 while the least significant digits of the current value for $L_R$ are transferred from the reference length counter and the difference between this $_R$ value and the previously stored $L_{RI}$ digits found and the results stored as $C_G$. Since the corresponding reference interval is known, it is determined if $C_G$ varies from it by more than one percent, for example as shown at block 470. If not, the process continues via branch 471 and returns to counting $\delta l$ pulses, updating $L_R$ and checking for the next mark as described above.

If, however, the deviation between the number of $\delta l$ pulses received and the number normally expected for mark intervals exceeds one percent as indicated by a YES answer for the test of block 470 in FIG. 5B, a slippage alarm, such as shown at 332 of FIGS. 2 and 3 is enabled or set, as shown at block 472 of FIG. 5B. As previously explained, this alarm serves to alert the operator of the slippage condition.

If desired, a correction for the above-detected slippage may be applied. As indicated at block 474 of FIG. 5B, the deficiency in $\delta l$ pulses occurring between the mark intervals is found and scaled as a correction factor N and input in another correction routine, such as shown in FIG. 5A for wheel calibration. Similarly, although not shown in FIG. 5B, the elongation correction process shown at block 340 of FIG. 2 may be performed in the same manner.

Returning to FIG. 3, the least significant digits $L_{RI}$ of digital signal $L_R$ are transferred through a multiple link 551 to slip correction factor calculation circuit 554 as described above. Circuit 554 also has a memory 53 designed to store as $\delta l$ pulses the reference distance between the zero of the tool and the first magnetic mark of the wireline. When the corrected incremental pulses correspond to millimeters, $L_{RI}$ is expressed in millimeters (five significant digits) and corresponds to any length shorter than the unit reference interval chosen (100 m. for example).

A link 61 between mark detection circuit 560 and calculation circuit 554 transmits mark detection pulses to a routing circuit 555 included within calculation circuit 554. As was described in regard to FIG. 5B, this routing circuit 555 is adapted so that, when it first goes into operation under the action of the pulse detecting the first mark of the wireline, it is possible to transfer and store in memory 553 digits, expressing, for example, in millimeters, the reference length $L_R$ at that instant.

Following this transfer, routing circuit 555 switches over and becomes adapted so that, under the action of mark detection pulses which follow, it is possible to transfer to adder-subtracter 557 the lower-order digits $L_{RI}$ which appear at that instant on the multiple link 551. The algebraic difference between the numbers contained in the memory 553 and the adder-subtracter 557 is then produced under the action of the clock pulses H equal to that contained in 553, which make the number remaining in 557 equal to this difference, which is then stored in another adder-subtracter memory 563. As the reference interval equals 100 meters, the number in adder-subtracter 563 expresses in $10^{-5}$ the wheel slip correction factor $C_G$. Depending on the sign of this factor, these digits constitute the input numbers N1 or N2 of the circuit of FIG. 7 applied via the multiple link 565 to the calculation circuit 552. This slip correction factor $C_G$ is stored in the adder-substracter 563 until the next magnetic mark is detected.

Furthermore, this slip correction factor $C_G$ is applied to an alarm circuit 564 adapted to produce a luminous signal when the value of said factor exceeds a given threshold (one percent for example).

The two series of pulses $\pm \delta l_{RC}$ for reference measurement and corrected for slip $C_G$ are applied to a first elongation correction calculation circuit 566 (similar to and with inputs like circuit 255 of FIG. 7). This calculation circuit 566 receives, via a multiple link 567, a digital signal N1 representative of $E.T_M = E.(T_X + T_B)/2$ (recall $T_M$ corresponds to the tension in the middle of the wireline section suspended in the borehole) and a digital signal N2 coming from the circuit 544 via a multiple link 543 and representative of $ET_R$. The signal $ET_M$ is delivered by a continuously operating type analog-to-digital converter 568, like 542 and 544, to which is applied an analog surface tension signal $T_S$, analog downhole tension signal $T_B$ generated by a sensor 70 placed at the lower end of the wireline 14, and a signal proportional to the elasticity coefficient E of the wireline. In the case where the tool 12 does not have a downhole tension sensor, a constant signal $T_B$ representative of the weight of the tool in the fluid contained in the borehole will be introduced manually into the converter 568 at the beginning of the operations.

Calculation circuit 566 generates two series of pulses relating to the first elongation correction of the wireline $\pm \delta l_{A1}$ each time the term $\Sigma \delta l_{RC}.E.T.$ equal a length increment $\delta l$ (with $T = T_M - T_R$). As the term E is the relative elongation of the wireline per unit tension applied, E.T. is a dimensionless number whose value is always lower than $10^{-2}$ for the different well-logging wirelines available on the market; i.e., for the maximum possible values of E and T. Under these conditions, at least one hundred reference length pulses $\pm \delta l_{RC}$ are necessary for generating a first elongation correction pulses $\pm \delta l_{A1}$.

The higher-order (most significant) digits $L_{RS}$ of digital signal $L_R$ generated by the reference length adder 556 (hundreds of meters or thousands of feet) are applied via a multiple link 569 as a digital input signal ($N_1$) to a second elongation correction calculation circuit 572, like circuit 255, which receives on its two inputs two series of differential relative elongation pulses $\pm E.\delta T$ produced by two additional OR circuits 573 and 575 which receive on their two inputs a quantized average relative elongation and reference pulses $\pm E.\delta T_M$ and $\pm E.\delta T_R$ resepectively produced by the least significant output stage of the analog-to-digital converters 568 and 544. Hence, the calculation circuit 572 delivers two series of quantized second elongation correction pulses $\pm \delta l_{A2}$ each time the term $$\Sigma \delta T \cdot E \cdot L_R$$

equals a length increment $\delta l$. The factor of $E.\delta T$ above is a dimensionless number which defines the wireline's relative elongation increment. In the embodiment according to this invention, this factor may be taken equal as $2.5.10^{-6}$. Thus, for each line length of 400 meters (or $4.10^5$ increments) included in the measured wireline length, each relative elongation increment will cause the production of a second elongation correction pulse $\pm \delta l_{A2}$. For example, with a line length of 100 m, four of these relative elongation increments will produce the same quantized pulse.

The series of pulses $\pm \delta l_{RC}$, $\pm \delta l_{A1}$ and $\pm \delta_{A2}$ are applied, depending on their sign, to the inputs of two addition OR gates 574 and 576 respectively, having outputs on which appear true depth pulses respective of the true unit movements of the tool $\pm \delta l_t$. Moreover, two series of offset correction pulses of either sign can be generated under control of two manual control buttons ($+$) and ($-$) by a generating circuit 558 and synchronized by a signal $S_N$ delivered by the clock circuit 300. These depth offset pulses are also supplied, according to their sign, to the inputs of the two OR gates 574 and 576. The two series of pulses $\pm \delta l_t$ are applied to the add and subtract inputs of an adder-subtracter 578 which, consequently, delivers at its output a true depth digital signal representative of the true depth $L_t$ of the tool in the borehole. This value $L_t$ is displayed in a depth indicating device 580.

The two series of true depth pulses $\pm \delta l_t$ are moreover applied for purposes of driving recorder 18 and its recorded depths 592 and associated film or tape drive 590. The pulses are input to a comparison adder-subtracter 582 which receives, in opposition with the preceding, two series of incremental recorder depth pulses $\pm \delta l_r$ transmitted via two links 581 and 583 and produced by an angular advance device 584 (including, for example, an encoder and directional logic similar to the photoelectric encoder 136 or 137 and their associated directional logic such as used for wireline measurement wheels) integral with depth control shaft 586 of the recorder 18. In a photographic recorder, for example, the rotation of the shaft 586 is transmitted to two elements: a film drive reel 590 through a manually operated clutch (not shown) and a reel 592 carrying the depth inscriptions to be put on the film. A depth counter 594 displaying for the operator the depth inscriptions in the recorder 18 is also mounted on the shaft 586. Logging signals transmitted to the surface via the wireline 14 from borehole tool 12 after going through a surface processing unit in mobile lab 10 as shown in FIG. 2, are applied to the group of writing galvanometers in recorder 18 in the case of film recorders or to multiplex-A/D converters for digital tape recorders.

The digital signal constantly delivered by the comparison adder-subtracter 582 of FIG. 3 is representative of the difference between the true depth $L_t$ and the recorder depth $L_r$ of the tool. The capacity of this adder-subtracter corresponds to the maximum depth of a well (10,000 m). This output signal is applied to the input of a digital-to-analog converter 500 having a low-pass filter. The signal thus furnished by the converter 500 is consequently a DC voltage of constant polarity representative of the absolute value of the repeating error of the depth meter 594. The direction S of this error is furnished in the form of a binary signal generated by the adder-subtracter 582.

The amplitude and the directional signal S of this display error are applied to an amplification and shaping circuit 502 designed to deliver a DC signal of constant amplitude (10 V for example) for a negative display error higher than 15 cm, then a signal decreasing linearly with this error until a zero value, then a zero signal for a positive display error between 0 and 2.5 cm, then another signal increasing linearly with the display error from 2.5 up to 17.5 cm and, finally, a signal of constant amplitude (10 V again) for a positive display error higher than 17.5 cm.

Figure 4:
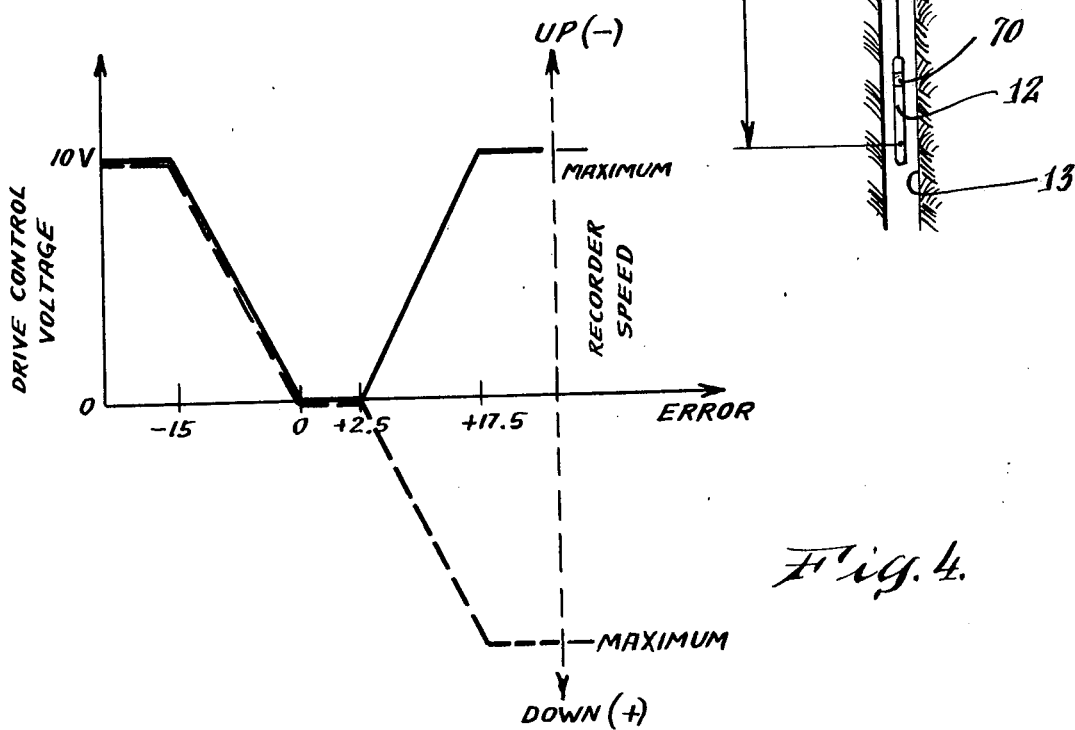
FIG. 4 shows a relationship between a voltage present in the circuits of FIG. 3 and used to drive a recorder and the corresponding speed of the recorder.

The above voltage and corresponding recorder speed versus error is illustrated in FIG. 4, the voltage as a solid line using the left axis, the recorder speed as a dashed line using the right axis.

Referring again to FIG. 3, the output signal of the amplification and shaping circuit 502 is applied to the control terminal of a variable frequency oscillator 504 adapted to generate a frequency varying from 0 to 1500 Hz in accordance with the amplitude of the control signal. The output signal of oscillator 504 and the binary error-direction signal (line 501) are input to a double control amplification circuit 506 designed to deliver, respectively to two groups of windings of a reversing stepping motor 508, two pulsed current groups of constant amplitude whose frequency and phase are determined by the two input signals. The motor 508 is coupled to the shaft 586 described above.

It is known that logging in a given borehole is carried out at increasingly greater depths during successive operations separated by time intervals capable of reaching several weeks or several months. It is hence indispensable that the successive recordings thus carried out should coincide precisely. It is also desirable for the borehole sections in which logging was carried out during earier operations and which were later cased, should permit tool lowering and raising speeds as high as possible so that the total duration of the operation is not extended unnecessarily. It is moreover known that the reel 592 carrying the depth inscriptions is a fragile mechanical element whose safe rotating speed is limited to a relatively low value, corresponding for example to a tool movement speed of about 2 m/sec. (20,000 feet/1 hour).

When a tool is to be lowered into a borehole by means of a wireline, all of the adder-subtracters of the above-described depth measurement system are resetting to zero when the measurement zero of the tool 12 is at zero level at the earth surface. A general manual control (not shown) makes it possible to carry out this operation. When the tool is lowered into the borehole, the two pulse trains delivered by either photoelectric encoder 136 or 137 coupled to measurement wheels 135 or 140 or any other suitable wheel which bears tangentially on the wireline 14, are distinguished in the synchronized directional logic 304 and two series of incremental gross length measurement pulses $\pm \delta l_m$ are produced in accordance with the instantaneous wireline movement direction, each of these pulses being representative of a length increment (1 mm or 1/10 inch, for example) under the tension $T_S$ measured at 40.

Synchronized by clock circuit 300 as shown in FIG. 2 these two pulses are corrected by correction circuit 301 or 303 in accordance with a calibration coefficient $C_R$ (input by thumbwheel) specific to the measurement wheel used. Thus $\pm \delta l_m$ pulses become $\pm \delta l_{mc}$. Then in calculation circuit 540, which receives from the analog-to-digital converter 542 a constant digital signal representative of $E.T_S$ and, from the analog-to-digital converter 544, another constant digital signal representative of $ET_R$, the operation ($ET_S - ET_R$) is carried out and pulses representative of $\pm \delta l_{mc}$ times ($ET_S - ET_R$) are produced which are combined algebraically with the pulses $\pm \delta l_{mc}$ to give two series of reference length pulses $\pm \delta l_R$.

When the wireline is to be marked as it is being lowered, these pulses $\pm \delta l_R$ are applied to the reference interval adder 546. The slippage calculation circuit 550 may be used or disconnected, depending upon the existence of any old marks which might be useful in slippage detection, and perhaps even correction.

The operator, when he deems appropriate, brings about the application of the first mark by manual action on the marking control C as shown in FIG. 3 of the adder 546. The effect of this is to furnish, on the line 545, an input pulse for the marking control 548 and to reset the adder 546 to zero. During this lowering, the reference length pulses $\pm \delta l_R$ are counted in the adder 546 (capacity $10^5$ when using metric based increments), and each time this adder is full, a new marking control pulse is produced, the interval separating two pulses thereby being 100 m for example.

If the wireline has been marked during a previous lowering or if the tool is in the process of being raised, the link between the adding circuit 546 and magnetic marking control 548 may be broken by switch 549 shown in FIG. 2. The output of mark detection circuit 560 as shown in FIG. 3 is input to the slip correction calculation circuit 554 which is then in the active state. As indicated above, in the correction circuit 552, the reference length pulses $\pm \delta l_R$ are corrected for slip in accordance with the correction factor $C_G$ generated by the slip factor correction circuit 554. This circuit 554 receives the low-order digits $L_{RI}$ (link 551) of the number stored by the slip-corrected reference depth adder 556 to which are applied the pulses $\pm \delta l_{RC}$. These digits express to within one hundred meters, for example, with five significant digits (millimeters) the distance between the zero of the tool and the magnetic marks carried by the wireline.

With the first pulse delivered by the mark detection circuit 560, these digits are transferred to the memory 553 by the action of the routing circuit 555. With the following detection pulses, these digits are transferred to the adder-subtracter 557 and the algebraic difference between the numbers stored at 553 and 557 is then established in the adder-subtracter 563. On the multiple link 565 appears in $10^5$ the slip correction factor $C_G$, since it expresses in this metric base example, a number in milliliters, for a slip correction related to 100 meters. A similar scaling will be apparent for foot based systems. $C_G$ may also be applied to a comparator and alarm circuit 564 which delivers an alarm signal when $C_G$ becomes higher than a fixed threshold (1 percent, for example) informing the operator that the measurement wheel drive conditions must be improved (wireline to be cleaned, etc., or an alternate wheel encoder selected).

The corrected reference length pulses $\pm \delta l_{RC}$ are also input to two addition OR circuits 574 and 576 which moreover receive the elongation correction pulses $\pm \delta l_{A1}$ and $\pm \delta l_{A2}$ furnished by the calculation circuits 566 and 572 respectively. On the outputs of OR circuits 574 and 576 appear two series of true depth pulses $\pm \delta l_t$. These pulses $\pm \delta l_t$ are totaled in adder-subtracter circuit 578 and the true depth calcuated by circuit 578 then displayed by a depth indicator 580.

The $\delta l_t$ pulses are moreover applied for adding and comparision in adder-subtracter 582 to produce a true length $L_T$. Circuit 582 also receives, for subtraction recorder-depth pulses corresponding to $L_r$ delivered by rotational encoder 584 integral with reel 592 via shaft 586 carrying the depth inscriptions and with depth indicating meter 594. The comparision of $L_T$ and $L_r$, produces an error signal and a corresponding directional signal S. The error signal is input to circuit 500, low pass filtered and converted to an analog voltage. This voltage is amplified and shaped in circuit 502 which, through the variable frequency oscillator 504 and control circuit 506, controls the speed of the motor 508 driving of recorder 18. The drive control delivers a signal of limited amplitude (10 V), changing the recorded depths on reel 592 at a speed which is always lower than its safety threshold. Moreover, thanks to a sensitivity threshold (2.5 cm) for the error signal shaped in 502, no spurious oscillation appears in a loop including the motor, the recorder drive and the encoder.

The recoder depth pulses $\pm \delta l_r$ applied to the adder-subtracter 582 have a limited frequency and, hence, the adder-subtracter 582, owing to its high capacity (10,000 m = $10^7$ pulses), behaves like an error memory which at all times generates the difference between the true depth $L_T = \Sigma \delta l_t$ of the tool and the recorder depth $L_r = \Sigma \delta l_r$ in the recorder. The result is that, after having disconnected the film drive reel 592, by action of a clutch or the like, the operator can lower or raise the tool in certain sections of the well at the highest speed he considers suitable without having to worry in any way about the limit recording speed, imposed in photographic recorder by the depth inscription reel 592 of the recorder, or in magnetic tape recorders, for example, by the tape read speed.

When the tool reaches a given depth as determined by a particular feature (characteristic of a fixed borehole depth (casing shoe or formation), the exhibiting depth of which was determined during a previous measurement, the operator checks that the depth displayed at 580 actually corresponds to this predetermined depth. If, for difference reasons (different wireline or measurement wheel, for example), such is not the case, the operator, by action on the controls (±) or (−) of the offset correction circuit 558, applies pulses of one or the other direction to the addition circuits 574 or 576, thereby modifying in an appropriate direction, the indications of the display 580 and of the depth meter 594.

From the preceding the result is that, besides the introduction of the parameters E, $T_R$ and $T_B$ where applicable, only two actions are required of the operator: resetting to zero of meters when the zero of the tool is at the zero of the surface and, if necessary, resetting of the depths on a characteristic level taken as a reference, in the case where an important element of the measurement system has been modified since a former operation to which one wishes to refer.

This constitutes a significant advantage in relation to the former operating tasks required of logging operators and allows these operators to fulfill their functions with the highest convenience: The true depth of the tool is calculated at all times. In the recorder, the recording of this true depth, for downward as well as upward movement, takes place automatically at the maximum safe speed allowed and, in addition, it continues until the numbers of the true depth and recorded depth increments $\Sigma\delta l_t$ and $\Sigma\delta l_r$ are equal. The true depths thus recorded are superimposed to within less than 2.5 cm (the width of the insensitivity range of the recording loop) on the depths of the different log recordings carried out by means of the same wireline during previous lowerings.

The above features stem from the slip correction calculated and carried out by the circuits 554 and 552 which has the effect of relating any new depth measurement to the magnetic marks applied during a previous lowering taken as a reference. Moreover, thanks to the alarm circuit 564, the operator is immediately informed of any accidental malfunctioning of the measurement wheel and, hence, can take immediate action. Such repeatability makes it possible, in particular, to eliminate any operator action relative to depth corrections. As regards the absolute accuracy of measurements, it is determined by the qualities of the measurement wheel during the lowering of the wireline when the marking operation is carried out. Among these qualities, note should be made of the high dimensional stability of the wheel and the low value of its relative slip on the wireline. Toward this end, the two wheel system described in the previously identified copending Lavigne et al. application is preferred.

The invention is of course not limited to the embodiments described above by way of example. In particular, an alternative would consist in proceeding with all or part of the different calculations described using absolute magnitudes instead of incremental magnitudes and, in particular, processing the variations per unit of time (1ms for example) of the concerned parameters instead of processing the elementary variations (increments) of these same parameters. Further, as exemplified by the process diagrams shown in FIGS. 5A and 5B, all or part of the process may be done in a properly programmed digital computer or microprocessor, either at the well site or at a remote location when the incremental pulse signals and tension measurements are recorded or transmitted for use with such computers.

The above-described embodiments are, therefore, intended to be merely exemplary and all such variations and modifications are intended to be included within the scope of the invention as defined in the appended claims.

We claim:

1. Apparatus for providing a repeatable signal representative of movement of a wireline under varying wireline measurement conditions and driving a recorder for depth recording measurements from borehole tools lowered in a borehole on said wireline, said wireline having been previously marked with magnetic marks placed on said wireline at selected intervals measured under a known reference tension, comprising:

means for producing signals corresponding to different types of wireline movement measurements at generally the same point on said wireline and at common reference conditions, said means for producing signals comprising:

first means mechanically coupled to said wireline for providing incremental first type signals corresponding to incremental movement for said wireline at said point;

second means for providig second type signals corresponding to movement past said point of said magnetic marks placed on said wireline at selected intervals measured under a known reference tension; and tension measurement and tension correcting means for measuring the tension of said wireline during said movement and tension correcting said incremental first type signals to said known reference tension, whereby said second type and tension-corrected first type signals correspond to the same movement of said wireline under ideal measurement conditions; and means for automatically utilizing said second type signals to start and stop counting said incremental tension-corrected first type signals to obtain a count for an interval between successive second type signals and correcting said tension-corrected first type signals when said count is less than a number corresponding to the number of counts normally expected for said selected intervals to provide a repeatable signal representative of said wireline movement under varying mechanicallly coupled wireline measurement conditions.

2. The apparatus of claim 1 wherein said means for automatically utilizing further comprises means for automatically providing an alarm signal indicating slippage of said mechanically coupled means on said wireline when said count is less than the number of counts normally expected for said selected intervals, said alarm signal enabling correction of said slippage and use of said first signal as said repeatable signal.

3. The apparatus of claim 1, wherein said utilizing means further comprises means for automatically correcting said first type signals for said slippage by adding additional incremental signals to said tension-corrected first type signals to provide an automatically corrected first type signal as said repeatable signal.

4. The apparatus of claim 3 wherein said additional incremental signals correspond to the difference between the expected count and the obtained count for said interval and are added during a subsequent interval.

5. The apparatus of claim 4 wherein said utilizing means includes means for providing borehole depths corresponding to a borehole tool lowered in a borehole by said wireline movement by accumulating said automatically corrected first type signals.

6. The apparatus of claim 4 wherein said utilizing means includes means for accumulating said automatically corrected first type signals to provide borehold depths of said borehole tool.

7. The apparatus of claim 6 wherein said utilizing means includes a recorder for recording borehole tool measurements in correspondence with previously recorded depths and means for driving said recorder to change said previously recorded depths; said recorder driving means comprising means for producing signals corresponding to changes in said recorded depths produced by driving said recorder; and means for automatically comparing said recorded depths with said borehole depths and controlling said recorder driving so that said recorded depths and said borehole tool depths correspond to one another.

8. The apparatus of claim 7 wherein said recorder has a maximum safe speed for changing said recorded depths and said controlling provides for allowing said recorded depths to differ from said borehole depths when said borehole tool depths change faster than said maximum safe speed.

9. The apparatus of claim 8 wherein said driving means comprises means for driving said recorder at speeds no more than said maximum safe speed until said recorded depths compare with said borehole tool depths within a small selected range.

10. The apparatus of claim 1 wherein said means for automatically utilizing comprises means for utilizing said signals to provide the depth of a borehole tool lowered in a borehole by said wireline movement; and means for utilizing said repeatable signal for driving a borehole tool measurement recorder having previously recorded depths, said recorder driving means comprising:

means for producing signals corresponding to said recorded depths during the driving of said recorder; and means for controlling said recorder driving so that said recorded depths and said borehole tool depths correspond to one another.

11. The apparatus of claim 10 wherein said recorder has a maximum safe speed for changing said recorded depths and said controlling comprises means for allowing said recorded depths to differ from said borehole tool depths when said borehold tool depths change faster than said maximum safe speed.

12. The apparatus of claim 11 wherein said driving means comprises means for driving said recorder at speeds no more than said maximum safe speed until said recorded depths compare with said borehold tool depths within a small selected range.

13. Apparatus for driving a recorder for recording borehole tool measurements in correspondence with a borehole tool lowered on a wireline in a borehole penetrating the earth's surface, comprising:

means for producing first signals corresponding to movement of said wireline at the earth's surface;
means for utilizing said first signals to provide a depth indication for a borehole tool run in a borehole on said wireline;

means for producing second signals corresponding to previously recorded depths of said recorder;
means for utilizing said second signals to provide a depth indication corresponding to said recorded depths; and
means for driving said recorder and controlling said recorder driving so that said recorded depth indications and said borehole tool depth indications correspond to one another.

14. The apparatus of claim 13 wherein said recorder has a maximum safe speed for changing said recorded depths and said controlling comprises means for allowing said recorded depths to temporarily differ from said borehole tool depths when said borehole tool depths change faster than said maximum safe speed.

15. The apparatus of claim 14 wherein said driving means comprises means for driving said recorder at speeds no more than said maximum safe speed until said recorded depths compare with said borehole tool depths within a small selected range.

16. Apparatus for driving a recorder having previously recorded depths and matching said recorder depths with depths of a borehole tool lowered in a borehole on a wireline, comprising:

means for producing incremental signals corresponding to predetermined increments of movement of said wireline;
mans for utilizing said wireline movement incremental signals to provide borehole depth indications for said borehole tool;
means for driving said recorder to change said previously recorded depths;
means for providing incremental recorder depth signals corresponding to predetermined incremental changes in said previously recorded depths;
means for utilizing said incremental recorder depth signals to provide recorder depth indications; and
means for controlling said recorder drive means to match said provided borehole depth indications with said recorder depth indications.

17. The apparatus of claim 16 wherein said recorder has a maximum safe speed for driving said recorder and said controlling comprises means for allowing said recorder depth indications to automatically vary from said match with borehole depth indications when said borehole tool depths change faster than said maximum safe speed and to later rematch said borehole depth indications when said tool depths change slower than said maximum safe speed.

18. The apparatus of claim 17 wherein said driving means comprises means for driving said recorder at speeds no more than said maximum safe speed until said recorded depths compare with said borehole tool depths within a small selected range.

19. The apparatus of claim 17 wherein said means for producing incremental signals corresponding to predetermiend increments of movement of said wireline comprises:

first means mechanically coupled to said wireline and including a low load encoder for providing first signals corresponding to incremental movement of said wireline;
second means magnetically coupled to magnetic marks placed on said wireline at selected intervals for providing second signals corresponding to said intervals; and means for automatically utilizing said first and second signals to provide said incremental signals under varying mechanical coupling conditions.

20. The apparatus of claim 19 wherein said automatically utilizing said first and second signals comprises utilizing said second signals to correct said first signals for slippage occurring under said varying mechanical coupling conditions.

21. Method for providing repeatable signals representative of movement of a wireline under varying measurement conditions, said wireline having been marked by placement of magnetic marks at selected intervals measured under a known reference tension, comprising:
   producing incremental first signals corresponding to incremental movement of an encoder mechanically coupled at one point to said wireline for movement with movement of said wireline;
   producing wireline tension measurements during said movement of said wireline and tension correcting said incremental first signals for differences between said known reference tension and said wireline tension measurements;
   producing second signals corresponding to intervals between magnetic marks detected near the encoder coupling point and placed on said wireline at selected intervals measured under said reference tension; and
   automatically utilizing said second signals for detecting and correcting the tension-corrected incremental first signals for slippage between said mechanically coupled encoder and said wireline by counting the number of increments in said tension-corrected incremental first signals between said second type signals and adding additional incremental signals when said number is less than the number of increments normally expected between said selected intervals to provide said repeatable signals.

22. The method of claim 21 and further including utilizing said provided repeatable signals for driving a recorder having previously recorded depths; said recorder drive providing incremental recorder depth signals corresponding to predetermined incremental changes in said previously recorded depths; said utilizing comprising comparing the number of increments for said repeatable signals with the number for said increment recorder depth signals and controlling said recorder driving such that said numbers correspond to one another.

23. The method of claim 22 wherein said recorder has a maximum safe speed for driving said recorder and said controlling allows the number of increments for said incremental recorder depth signals to temporarily lag behind the number of increments for said repeatable signals when said maximum safe speed is exceeded and to automatically catch up later without exceeding said maximum safe speed.

24. The method of claim 21 and further including utilizing said provided repeatable signals for driving a recorder having previously recorded depths; said recorder drive providing incremental recorder depth signals corresponding to predetermined incremental changes in said previously recorded depths; said utilizing comprising comparing the number of increments for said repeatable signals with the number for said increment recorder depth signals and controlling said recorder driving such that said numbers correspond to one another.

25. The method of claim 24 wherein said recorder has a maximum safe speed for driving said recorder and said controlling allows the number of increments for said incremental recorder depth signals to temporarily lag behind the number of increments for said repeatable signals when said maximum safe speed is exceeded and to automatically catch up later without exceeding said maximum safe speed.

26. Apparatus for providing a signal representative of movement of a wireline used in logging a borehole under varying wireline measurement conditions for recording measurements from borehole tool lowered in said borehole on said wireline, comprising:
   means for generating a series of electrical pulse signals corresponding to rotation of a wireline measurement wheel tangentially coupled to said wireline for rotation of said wheel, said wireline having tension differing from a reference tension such that said generated series of electrical pulse signals require multiplication by a predetermined factor for correction to said reference tension, said factor differing from unity by a small number requiring scaling by n powers of 10 to form an integer number N;
   means for automatically correcting said signals and providing a corrected series of electrical pulse signals correspondig to said reference tension, said means comprising a first counter adapted for counting said electrical pulse signals and outputting one pulse for every $10^{P_1}$ pulse, said one pulse enabling the output of N pulses to a second counter adapted for counting said N pulses and outputting one pulse for every $10^{P_2}$ pulses input to said second counter, where P2 corresponds to the number of digits defining N and where P1 corresponds to n - P2 with n being related to said required scaling by powers of 10 to form N; and
   means for automatically utilizing said corrected signals to provide a signal suitable for driving a recorder for recording measurements from said borehole tool in corresponding with borehole depths of said tool.

* * * * *

UNITED STATES PATENT AND TRADEMARK OFFICE
CERTIFICATE OF CORRECTION

PATENT NO. : 4,117,600

DATED : October 3, 1978

INVENTOR(S) : Jean Guignard et al

It is certified that error appears in the above-identified patent and that said Letters Patent are hereby corrected as shown below:

Col. 4, line 25 "sheaves" should read -- sheave --.

Col. 12, line 39 "provdide" should read -- provide --.

Col. 19, line 29 "i" should read -- $\underline{i}$ --.

Col. 19, line 48 "i" should read -- $\underline{i}$ --.

Col. 20, line 13 "seriees" should read -- series --.

Col. 22, line 9 "53" should read -- 553 --.

Col. 26, line 13 "$10^5$" should read -- $10^{-5}$ --.

Col. 27, line 7 "difference" should read -- different --.

Col. 28, line 27 "providig" should read -- providing --.

Col. 30, line 29 "mans" should read -- means --.

Col. 30, line 58 "predetermiend" should read -- predetermined --.

Col. 32, line 54 "corresponding" should read -- correspondence --

Col. 23, line 44 "$\pm\delta_{A2}$ should read -- $\pm\delta\ell_{A2}$ --.

UNITED STATES PATENT AND TRADEMARK OFFICE
CERTIFICATE OF CORRECTION

PATENT NO. : 4,117,600
DATED : October 3, 1978
INVENTOR(S) : Jean Guignard et al It is certified that error appears in the above-identified patent and that said Letters Patent are hereby corrected as shown below:

The symbol "1" which appears consistently throughout the patent in Cols. 11, 12, 19, 20, 21, 22, 23, 25 and 26 is equal to the symbol -- $\ell$ -- which appears in the drawings.

Signed and Sealed this

*Eighteenth* Day of *September 1979*

[SEAL]

*Attest:*

LUTRELLE F. PARKER

*Attesting Officer*     *Acting Commissioner of Patents and Trademarks*